United States Patent
Bellicoso et al.

(10) Patent No.: US 12,168,300 B2
(45) Date of Patent: Dec. 17, 2024

(54) NONLINEAR TRAJECTORY OPTIMIZATION FOR ROBOTIC DEVICES

(71) Applicant: Boston Dynamics, Inc., Waltham, MA (US)

(72) Inventors: C. Dario Bellicoso, Boston, MA (US); Logan W. Tutt, Boston, MA (US); Neil M. Neville, Waltham, MA (US); Alexander D. Perkins, Lincoln, MA (US)

(73) Assignee: Boston Dynamics, Inc., Waltham, MA (US)

( * ) Notice: Subject to any disclaimer, the term of this patent is extended or adjusted under 35 U.S.C. 154(b) by 146 days.

(21) Appl. No.: 17/504,445

(22) Filed: Oct. 18, 2021

(65) Prior Publication Data
US 2023/0117928 A1   Apr. 20, 2023

(51) Int. Cl.
*B25J 9/16* (2006.01)
*B25J 13/08* (2006.01)

(52) U.S. Cl.
CPC ........... *B25J 9/1666* (2013.01); *B25J 9/1633* (2013.01); *B25J 9/1653* (2013.01); *B25J 9/1676* (2013.01); *B25J 13/085* (2013.01); *B25J 13/089* (2013.01)

(58) Field of Classification Search
CPC ........ B25J 9/1666; B25J 9/1633; B25J 9/162; B25J 13/089; B25J 9/1676; G05B 2219/40513
See application file for complete search history.

(56) References Cited

U.S. PATENT DOCUMENTS

| | | |
|---|---|---|
| 9,238,304 B1 | 1/2016 | Bradski et al. |
| 9,272,417 B2 | 3/2016 | Konolige et al. |
| 9,333,649 B1 | 5/2016 | Bradski et al. |

(Continued)

FOREIGN PATENT DOCUMENTS

| | | |
|---|---|---|
| CN | 108621165 A | 10/2018 |
| CN | 112000088 A | 11/2020 |
| WO | 2021065196 A1 | 4/2021 |

OTHER PUBLICATIONS

International Search Report and Written Opinion of the International Searching Authority for International Application No. PCT/US2022/046526, dated Jan. 30, 2023.

(Continued)

*Primary Examiner* — Jonathan L Sample
*Assistant Examiner* — Mohammed Yousef Abuelhawa
(74) *Attorney, Agent, or Firm* — PIERCE ATWOOD LLP

(57) ABSTRACT

Systems and methods for determining movement of a robot are provided. A computing system of the robot receives information including an initial state of the robot and a goal state of the robot. The computing system determines, using nonlinear optimization, a candidate trajectory for the robot to move from the initial state to the goal state. The computing system determines whether the candidate trajectory is feasible. If the candidate trajectory is feasible, the computing system provides the candidate trajectory to a motion control module of the robot. If the candidate trajectory is not feasible, the computing system determines, using nonlinear optimization, a different candidate trajectory for the robot to move from the initial state to the goal state, the nonlinear optimization using one or more changed parameters.

40 Claims, 15 Drawing Sheets

(56) References Cited

U.S. PATENT DOCUMENTS

| | | | |
|---|---|---|---|
| 9,630,316 B2 | 4/2017 | Konolige et al. | |
| 9,630,321 B2 | 4/2017 | Bradski et al. | |
| 9,764,469 B1* | 9/2017 | Sun | B25J 9/1664 |
| 9,987,746 B2 | 6/2018 | Bradski et al. | |
| 10,017,218 B1 | 7/2018 | Swilling et al. | |
| 10,035,266 B1* | 7/2018 | Kroeger | B25J 9/1664 |
| 10,946,519 B1* | 3/2021 | Prats | G05B 15/00 |
| 11,560,192 B2 | 1/2023 | Bai et al. | |
| 2003/0108415 A1* | 6/2003 | Hosek | B25J 9/1664 |
| | | | 414/217 |
| 2007/0016329 A1 | 1/2007 | Herr et al. | |
| 2007/0084278 A1 | 4/2007 | Kawal et al. | |
| 2011/0106309 A1 | 5/2011 | Lim et al. | |
| 2012/0158182 A1 | 6/2012 | Lee et al. | |
| 2012/0290131 A1 | 11/2012 | Khoukhi | |
| 2012/0316684 A1 | 12/2012 | Lee et al. | |
| 2014/0025201 A1 | 1/2014 | Ryu et al. | |
| 2015/0051734 A1 | 2/2015 | Zheng et al. | |
| 2016/0202670 A1* | 7/2016 | Ansari | G05B 13/026 |
| | | | 700/45 |
| 2016/0221187 A1 | 8/2016 | Bradski et al. | |
| 2018/0080841 A1* | 3/2018 | Cordoba | A61B 34/35 |
| 2019/0143517 A1* | 5/2019 | Yang | G06N 5/046 |
| | | | 700/245 |
| 2020/0086482 A1 | 3/2020 | Johnson et al. | |
| 2020/0171657 A1 | 6/2020 | Baier et al. | |
| 2021/0107150 A1 | 4/2021 | Whitman et al. | |
| 2021/0197370 A1 | 7/2021 | Chen et al. | |
| 2021/0291362 A1* | 9/2021 | Pivac | G05D 1/0248 |
| 2022/0089234 A1 | 3/2022 | Sprowitz et al. | |
| 2022/0202514 A1* | 6/2022 | Boudreaux | A61B 17/2909 |
| 2022/0410378 A1 | 12/2022 | Deits et al. | |

OTHER PUBLICATIONS

Alonso-Mora, et al., "Multi-Robot Navigation in Formation via Sequential Convex Programming," 2015, IEEE/RSJ International Conference on Intelligent Robots and Systems (IROS), Congress Center Hamburg, Germany, Sep. 28, 2015, pp. 4634-4641.

Meuller, et al., "A Computationally Efficient Algorithm for State-to-State Quadrocopter Trajectory Generation and Feasibility Verification", 2013, IEEE/RSJ International Conference on Intelligent Robots and Systems (ROS), Nov. 3, 2013, pp. 3480-3486.

Schiller, et al., "Suboptimal Nonlinear Moving Horizon Estimation", Arxiv. Org, Cornell University Library, 201 Olin. Library Cornell Library, Ithaca, NY 14853, Aug. 31, 2021, pp. 1-16.

Wenger, et al., "A Global Analysis of Following Trajectories by Redundant Manipulators in the Presence of Obstacles", IEEE Comp. Soc. Press, US, vol. 3, Publication Date, May 2, 1993, pp. 901-906.

Budhiraja et al., Dynamics consensus between centroidal and whole-body models for locomotion of legged robots. 2019 International Conference on Robotics and Automation (ICRA). Apr. 2019. 8 pages. doi:10.1109/ICRA.2019.8793878.

Carpentier et al., A versatile and efficient pattern generator for generalized legged locomotion. 2016 IEEE International Conference on Robotics and Automation (ICRA). May 2016. 8 pages. doi:10.1109/ICRA.2016.7487538.

Dafarra et al., Whole-Body Walking Generation using Contact Parametrization: A Non-Linear Trajectory Optimization Approach. arXiv:2003.04633v1. Mar. 10, 2020. 7 pages.

Dai et al., Whole-body motion planning with centroidal dynamics and full kinematics. 2014 IEEE-RAS International Conference on Humanoid Robots. Nov. 2014. 8 pages. doi:10.1109/HUMANOIDS.2014.7041375.

Fallon et al., An Architecture for Online Affordance-based Perception and Whole-body Planning. Computer Science and Artificial Intelligence Laboratory Technical Report. Mar. 16, 2014. 31 pages.

Hughes, Don't Get Lost in Deep Space: Understanding Quaternions, Mar. 10, 2017 https://www.allaboutcircuits.com/technical-articles/dont-get-lost-in-deep-space-understanding-quaternions (Year: 2017).

Kelly, An introduction to trajectory optimization: How to do your own direct collocation. SIAM Review. 2017;59 (4):849-904. 57 pages.

Kuindersma et al., Optimization-based locomotion planning, estimation, and control design for the atlas humanoid robot. Autonomous Robots. Mar. 2016,40(3):429-55. doi: 10.1007/s10514-015-9479-3.

Orin et al., Centroidal dynamics of a humanoid robot. Autonomous Robots. Oct. 2013;35(2):161-76. 17 pages. doi:10.1007/s10514-013-9341-4.

Ponton et al., On time optimization of centroidal momentum dynamics. arXiv:1709.09265v3. Feb. 26, 2018. 7 pages.

Wagner, More About Torque https://www.rpi.edu/dept/phys/Dept2/APPhys1/torque/torque/node11.html (Year: 1999).

Zordan et al., Control of rotational dynamics for ground and aerial behavior. IEEE Transactions on Visualization and Computer Graphics. Oct. 2014. 12 pages. doi: 10.1109/TVCG.2014.2330610.

International Preliminary Report on Patentability and Written Opinion from the International Bureau for Application No. PCT/US2022/046526, dated May 2, 2024, 10 pages.

* cited by examiner

NONLINEAR TRAJECTORY OPTIMIZATION FOR ROBOTIC DEVICES

TECHNICAL FIELD

This application relates generally to robotics and more specifically to systems, methods and apparatuses, including computer programs, for determining movements and/or trajectories of robotic devices.

BACKGROUND

A robot is generally defined as a reprogrammable and multifunctional manipulator designed to move material, parts, tools, and/or specialized devices (e.g., via variable programmed motions) for performing tasks. Robots may be manipulators that are physically anchored (e.g., industrial robotic arms), mobile devices that move throughout an environment (e.g., using legs, wheels, or traction-based mechanisms), or some combination of one or more manipulators and one or more mobile devices. Robots are currently used in a variety of industries, including, for example, manufacturing, warehouse logistics, transportation, hazardous environments, exploration, and healthcare.

SUMMARY

Some embodiments include systems, methods and apparatuses, including computer programs, for determining movements and/or trajectories of robotic devices. A robotic system can use one or more computing modules (e.g., a trajectory generator) to determine one or more motions (e.g., a trajectory, such as a candidate trajectory) for a robotic device. For example, a motion can be determined to move a robotic arm having an end effector from an initial state to a goal state. The motion can be determined using nonlinear optimization according to user-specified goals and/or constraints on the system (e.g., constraints imposed by the system itself and/or by the surrounding environment). One or more additional computing modules (e.g., a trajectory checker) can be used to determine whether the determined motions are feasible. Motions that are feasible can be used to move the robot, and motions that are not feasible can be adjusted and/or rejected in favor of different ones (e.g., different candidate trajectories generated based on varying parameters of nonlinear optimization).

In some embodiments, the trajectory generator can solve an optimization problem to find values (e.g., x) that minimize a cost function (e.g., f(x)) while satisfying a set of constraints and/or objectives (e.g., g(x)=0 and h(x)≤0). In some embodiments, the trajectory generator can approximate one or more constraints in the form of nonlinear functions. In some embodiments, candidate trajectories can be represented or approximated using a set of parameters (such as a sequence of polynomial splines, each described by a set of spline coefficients) that can be used as decision variables in a nonlinear programming (NLP) problem. In some embodiments, the NLP problem can be solved numerically, e.g., using sequential quadratic programming (SQP). In some embodiments, constraints can include robotic joint limits, smoothness requirements, time optimality requirements, and/or collision avoidance goals. In some embodiments, objectives can include minimizing task-space acceleration(s) and/or minimizing payload wrench(es).

In some embodiments, certain approximations made during nonlinear optimization can result in one or more constraints not satisfying their own bounds. As such, the trajectory checker can determine whether a given candidate trajectory is feasible. If the trajectory checker determines that the candidate trajectory is feasible, it can provide the trajectory to a motion control module of the robot. If the trajectory checker determines that the candidate trajectory is not feasible, it can prompt the trajectory generator to find a new solution (e.g., by modifying one or more nonlinear optimization parameters, such as timing or collision bounds). In some embodiments, the trajectory generator iteratively runs a nonlinear solver to generate candidate trajectories until a feasible candidate trajectory is determined (or a predefined numerical metric is exceeded, such as a number of attempts to find a solution or an acceptable boundary of an optimization parameter). In some embodiments, the trajectory checker iteratively checks candidate trajectories for feasibility before passing them to the motion control module and/or before designating them to govern motion of the robot.

In some embodiments, the system utilizes one or more "goal keyframes" (e.g., one or more full-robot poses through which a candidate trajectory is asked to move, and/or one or more locations to which the end-effector is asked to move). In some embodiments, goal keyframes are obtained from a perception module of the robot. In some embodiments, goal keyframes are user-specified. In some embodiments, a trajectory has at least two keyframes—one representing an initial state of the robot and one representing a goal state of the robot. In some embodiments, a trajectory has one or more intermediate keyframes. In some embodiments, keyframes are represented by numerical coordinates in joint space (e.g., joint angles). In some embodiments, keyframes are represented by numerical coordinates in "task space" or Cartesian space (e.g., positions and/or orientations). In some embodiments, both representations can be used (e.g., depending on whether a linear or a nonlinear constraint is to be imposed). In some embodiments, keyframes include position, velocity, acceleration, and/or time coordinates. In some embodiments, a keyframe can be set as an objective and/or a constraint.

In some embodiments, one or more of the systems and methods described herein allow the robot to operate in complex environments subject to multiple system limitations and/or environmental constraints. In one exemplary use case, a robot can grasp an object while satisfying multiple joint limits and avoiding collisions with itself and its environment (e.g., the nonlinear problem represents the grasped object as a robot link that must avoid collisions with itself and the environment). In some embodiments, using a NLP approach provides advantages over relying on hand-crafted motions or heuristics (which may apply only on a case-by-case basis and may not permit coping with a wide variety of physical environments and/or numerical constraints). In some embodiments, new trajectories can be calculated on an ongoing basis (e.g., periodically) and can account for changed circumstances. In some embodiments, trajectories can characterize motion of a robotic arm, a robotic base, and/or another component of a robotic system. Some embodiments described herein can be used for logistics applications, such as unloading a truck, building an order, or other warehousing activities, to provide considerable flexibility in crafting real-world motions that account for particular circumstances encountered during those activities.

In one aspect, the invention features a computer-implemented method. The method includes receiving, by a computing system of a robot, an initial state of the robot and a goal state of the robot. The method includes determining, by the computing system, using nonlinear optimization, a candidate trajectory for the robot to move from the initial state to the goal state. The method includes determining, by the computing system, whether the candidate trajectory is feasible. The method includes: (a) if the candidate trajectory is feasible, providing, by the computing system, the candidate trajectory to a motion control module of the robot; and/or (b) if the candidate trajectory is not feasible, determining, by the computing system, using nonlinear optimization, a different candidate trajectory for the robot to move from the initial state to the goal state, the nonlinear optimization using one or more changed parameters.

In some embodiments, the method further includes performing steps (a) and/or (b) until (i) a feasible candidate trajectory is determined and provided to the motion control module of the robot, or (ii) a number of attempts (e.g., one, two, three, five, 10, 20, 30, 40, 50 or 100) to determine a feasible candidate trajectory is unsuccessful and no trajectory is provided to the motion control module. In some embodiments, in cases in which no feasible candidate trajectory is determined, another computing module (e.g., a supervisor module) can determine how to proceed. In some embodiments, the method further includes moving the robot, using the motion control module, in accordance with the determination of the computing system. In some embodiments, the candidate trajectory includes, for each of one or more joints of the robot, parameters including position, velocity and acceleration. In some embodiments, the method further includes transforming the candidate trajectory into a set of reference torques (e.g., by a separate controller) for the each of one or more joints of the robot. In some embodiments, the method further includes transforming the set of reference torques into a set of actuator commands to move the each of one or more joints of the robot (e.g., by a separate joint servo controller). In some embodiments, the method further includes tracking, by the computing device, the feasible candidate trajectory using a feedback controller of the motion control module.

In some embodiments, the initial state and the goal state are provided by a perception module of the robot that is in communication with the computing system. In some embodiments, the initial state includes desired or measured positions, velocities and accelerations of one or more joints of the robot. In some embodiments, the goal state includes positions of one or more joints of the robot that are based on a desired SE(3) pose. In some embodiments, the method includes determining, by the computing system, an inverse kinematic pose corresponding to the goal state. In some embodiments, determining whether the candidate trajectory is feasible includes determining whether a robot joint limit has been exceeded. In some embodiments, the robot joint limit includes a padding parameter (e.g., a factor, either multiplicative or additive, that widens or reduces the bounds of a constraint).

In some embodiments, determining whether the candidate trajectory is feasible includes determining whether a collision is predicted based on a projected distance between a portion of the robot and at least one of an object in an environment of the robot, a payload of the robot, or a different portion of the robot. In some embodiments, the projected distance includes a padding parameter. In some embodiments, each candidate trajectory includes a set of parameters (e.g., decision variables such as polynomial spline coefficients, Bezier coefficients, and/or other variables) corresponding to each of one or more joints of the robot. In some embodiments, the set of parameters (e.g., decision variables) is computed using sequential quadratic programming. In some embodiments, the computing device minimizes a cost function of the robot while satisfying a set of one or more constraints. In some embodiments, the set of one or more constraints is applied at one or more times or phases.

In some embodiments, the candidate trajectory is calculated to avoid one or more collisions with at least one of the robot, a payload of the robot, or an object in an environment of the robot. In some embodiments, the candidate trajectory is calculated using a vector separating a constrained primitive portion of the robot from an external primitive portion of the robot or surrounding environment. In some embodiments, the candidate trajectory moves through one or more intermediate keyframe states. In some embodiments, the candidate trajectory reflects at least one of: (i) a robot joint limit constraint; (ii) a trajectory smoothness criterion; or (iii) a collision avoidance constraint. In some embodiments, the candidate trajectory minimizes at least one of the following: (i) one or more task-space accelerations; (ii) a payload wrench; or (iii) a trajectory time. In some embodiments, the robot is an industrial robot. In some embodiments, the robot includes a robot arm. In some embodiments, the robot includes an end effector.

In another aspect, the invention features a computing system of a robot. The computing system includes data processing hardware and memory hardware in communication with the data processing hardware. The memory hardware stores instructions that when executed on the data processing hardware cause the data processing hardware to perform certain operations. The operations include receiving, by a computing system of a robot, an initial state of the robot and a goal state of the robot. The operations include determining, by the computing system, using nonlinear optimization, a candidate trajectory for the robot to move from the initial state to the goal state. The operations include determining, by the computing system, whether the candidate trajectory is feasible. The operations include: (a) if the candidate trajectory is feasible, providing, by the computing system, the candidate trajectory to a motion control module of the robot; and/or (b) if the candidate trajectory is not feasible, determining, by the computing system, using nonlinear optimization, a different candidate trajectory for the robot to move from the initial state to the goal state, the nonlinear optimization using one or more changed parameters.

In some embodiments, steps (a) and/or (b) are performed until (i) a feasible candidate trajectory is determined and provided to the motion control module of the robot, or (ii) a number of attempts (e.g., one, two, three, five, 10, 20, 30, 40, 50 or 100) to determine a feasible candidate trajectory is unsuccessful and no trajectory is provided to the motion control module. In some embodiments, in cases in which no feasible candidate trajectory is determined, another computing module (e.g., a supervisor module) can determine how to proceed. In some embodiments, the operations further comprise moving the robot, using the motion control module, in accordance with the determination of the computing system. In some embodiments, the candidate trajectory includes, for each of one or more joints of the robot, parameters including position, velocity and acceleration. In some embodiments, the operations further comprise transforming the candidate trajectory into a set of reference torques (e.g., by a separate controller) for the each of one or more joints of the robot. In some embodiments, the operations further comprise transforming the set of reference torques into a set of actuator commands (e.g., by a separate joint servo controller) to move the each of one or more joints of the robot.

In some embodiments, the operations further comprise tracking, by the computing device, the feasible candidate trajectory using a feedback controller of the motion control module. In some embodiments, the initial state and the goal state are provided by a perception module of the robot that is in communication with the computing system. In some embodiments, the initial state includes desired or measured positions, velocities and accelerations of one or more joints of the robot. In some embodiments, the goal state includes positions of one or more joints of the robot that are based on a desired SE(3) pose. In some embodiments, the operations further include determining, by the computing system, an inverse kinematic pose corresponding to the goal state. In some embodiments, the operations further include determining whether the candidate trajectory is feasible includes determining whether a robot joint limit has been exceeded. In some embodiments, the robot joint limit includes a padding parameter. In some embodiments, determining whether the candidate trajectory is feasible includes determining whether a collision is predicted based on a projected distance between a portion of the robot and at least one of an object in an environment of the robot, a payload of the robot, or a different portion of the robot. In some embodiments, the projected distance includes a padding parameter.

In some embodiments, each candidate trajectory includes a set of parameters (e.g., decision variables such as polynomial spline coefficients, Bezier curve coefficients, and/or other variables) corresponding to each of one or more joints of the robot. In some embodiments, the set of parameters (e.g., decision variables) is computed using sequential quadratic programming. In some embodiments, the computing device minimizes a cost function of the robot while satisfying a set of one or more constraints. In some embodiments, the set of one or more constraints is applied at one or more times or phases. In some embodiments, the candidate trajectory is calculated to avoid one or more collisions with at least one of the robot, a payload of the robot, or an object in an environment of the robot. In some embodiments, the candidate trajectory is calculated using a vector separating a constrained primitive portion of the robot from an external primitive portion of the robot or surrounding environment.

In some embodiments, the candidate trajectory moves through one or more intermediate keyframe states. In some embodiments, the candidate trajectory reflects at least one of: (i) a robot joint limit constraint; (ii) a trajectory smoothness criterion; or (iii) a collision avoidance constraint. In some embodiments, the candidate trajectory minimizes at least one of the following: (i) one or more task-space accelerations; (ii) a payload wrench; or (iii) a trajectory time. In some embodiments, the robot is an industrial robot. In some embodiments, the robot includes a robot arm. In some embodiments, the robot includes an end effector.

BRIEF DESCRIPTION OF DRAWINGS

The advantages of the invention, together with further advantages, may be better understood by referring to the following description taken in conjunction with the accompanying drawings. The drawings are not necessarily to scale, and emphasis is instead generally placed upon illustrating the principles of the invention.

DETAILED DESCRIPTION

Figure 1A:
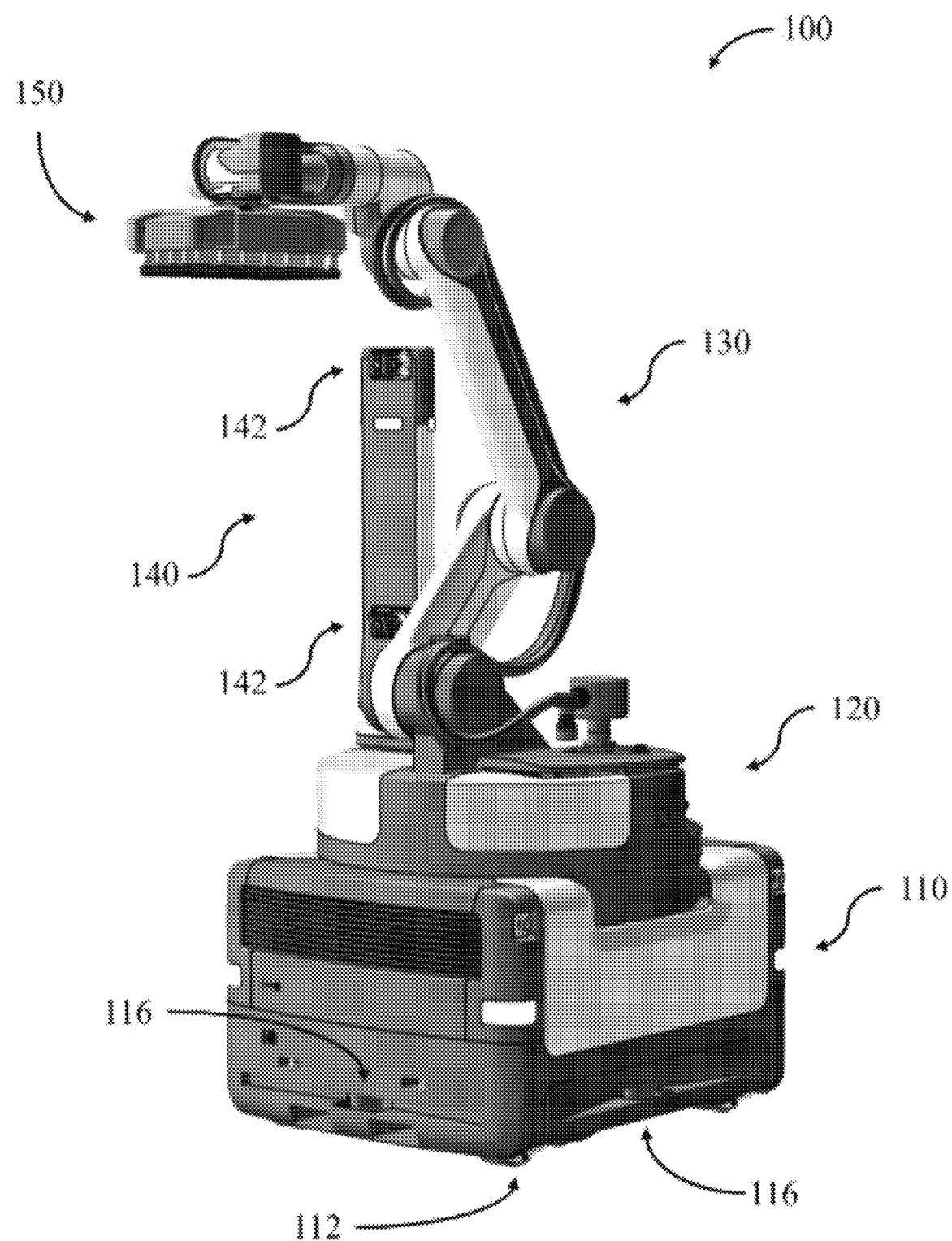
FIGS. 1A and 1B are perspective views of a robot, according to an illustrative embodiment of the invention.

Robots can be configured to perform a number of tasks in an environment in which they are placed. Exemplary tasks may include interacting with objects and/or elements of the environment. Notably, robots are becoming popular in warehouse and logistics operations. Before robots were introduced to such spaces, many operations were performed manually. For example, a person might manually unload boxes from a truck onto one end of a conveyor belt, and a second person at the opposite end of the conveyor belt might organize those boxes onto a pallet. The pallet might then be picked up by a forklift operated by a third person, who might drive to a storage area of the warehouse and drop the pallet for a fourth person to remove the individual boxes from the pallet and place them on shelves in a storage area. Some robotic solutions have been developed to automate many of these functions. Such robots may either be specialist robots (i.e., designed to perform a single task or a small number of related tasks) or generalist robots (i.e., designed to perform a wide variety of tasks). To date, both specialist and generalist warehouse robots have been associated with significant limitations.

For example, because a specialist robot may be designed to perform a single task (e.g., unloading boxes from a truck onto a conveyor belt), while such specialized robots may be efficient at performing their designated task, they may be unable to perform other related tasks. As a result, either a person or a separate robot (e.g., another specialist robot designed for a different task) may be needed to perform the next task(s) in the sequence. As such, a warehouse may need to invest in multiple specialized robots to perform a sequence of tasks, or may need to rely on a hybrid operation in which there are frequent robot-to-human or human-to-robot handoffs of objects.

In contrast, while a generalist robot may be designed to perform a wide variety of tasks (e.g., unloading, palletizing, transporting, depalletizing, and/or storing), such generalist robots may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible.

Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task.

In such systems, the mobile base and the manipulator may be regarded as effectively two separate robots that have been joined together. Accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while certain limitations arise from an engineering perspective, additional limitations must be imposed to comply with safety regulations. For example, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not threaten the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, a highly integrated mobile manipulator robot with system-level mechanical design and holistic control strategies between the manipulator and the mobile base may provide certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

Example Robot Overview

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1B:
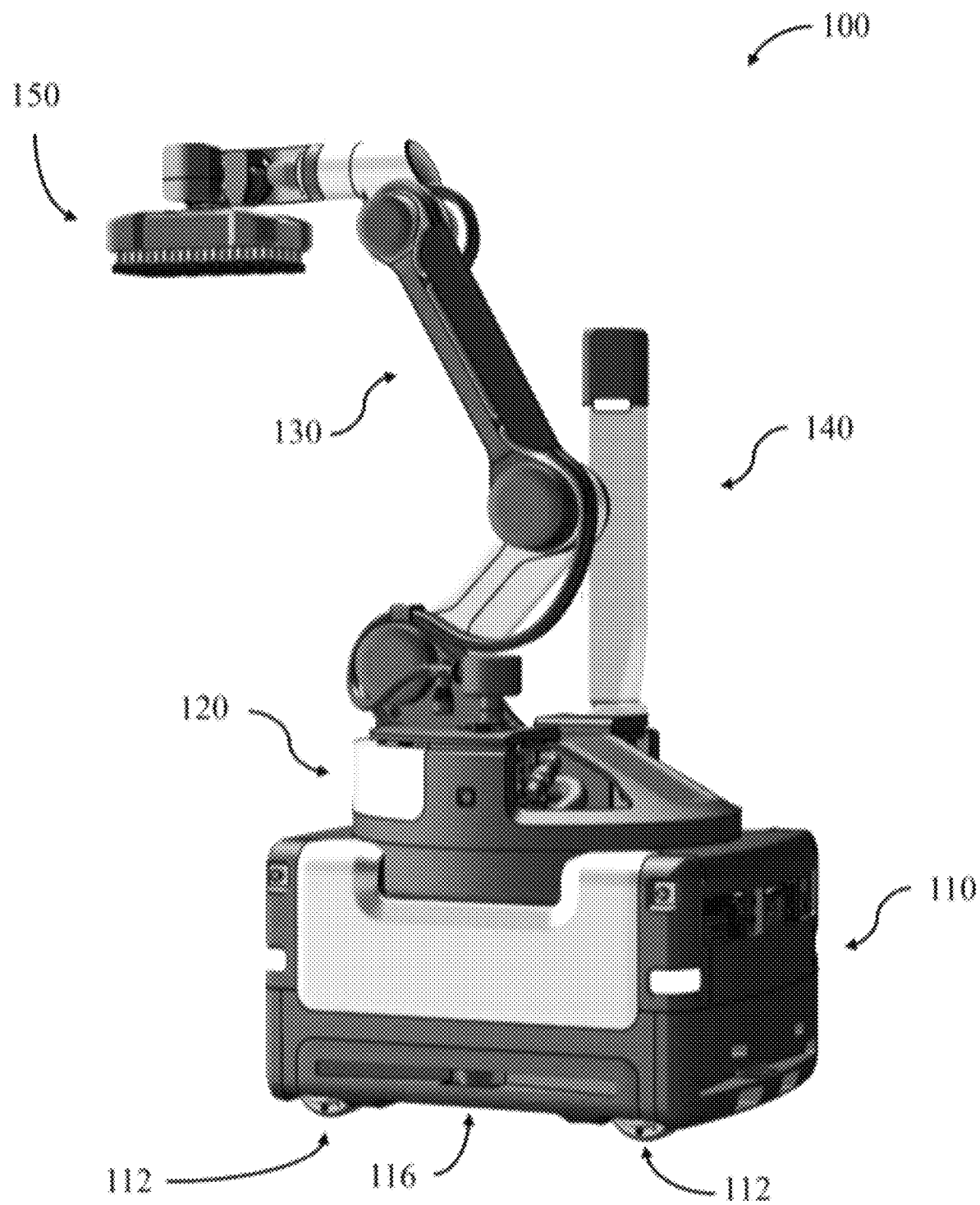

FIGS. 1A and 1B are perspective views of a robot 100, according to an illustrative embodiment of the invention. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 2A:
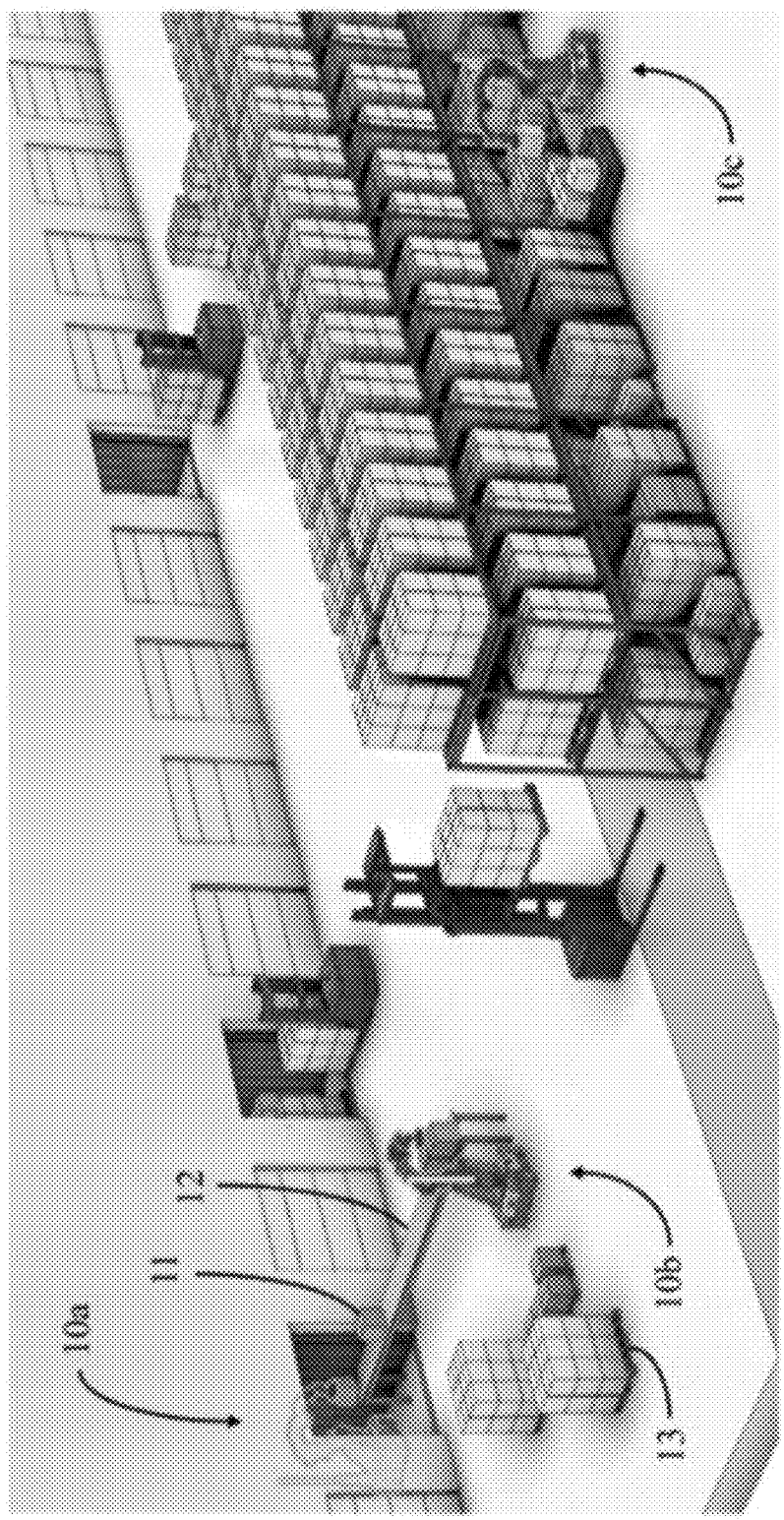
FIG. 2A depicts robots performing different tasks within a warehouse environment, according to an illustrative embodiment of the invention.

FIG. 2A depicts robots 10a, 10b, and 10c performing different tasks within a warehouse environment. A first robot 10a is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10b organizes the boxes 11 onto a pallet 13. In a separate area of the warehouse, a third robot 10c picks boxes from shelving to build an order on a pallet (this particular task will be discussed in greater detail below in reference to FIG. 2C). The robots 10a, 10b, and 10c can be different instances of the same robot or similar robots. Accordingly, the robots described herein may be understood as specialized multi-purpose robots, in that they are designed to perform specific tasks accurately and efficiently, but are not limited to only one or a small number of tasks.

Figure 2B:
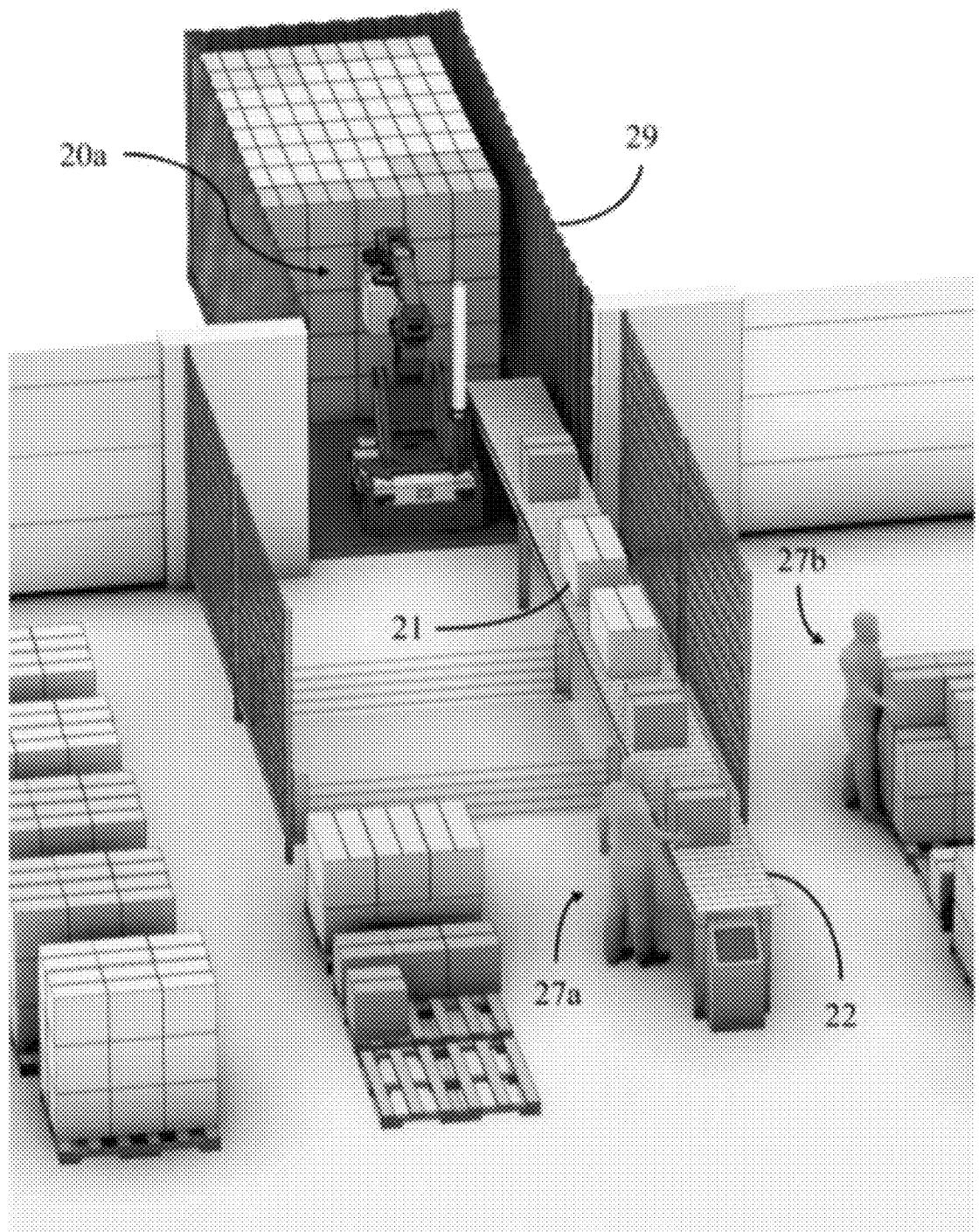
FIG. 2B depicts a robot unloading boxes from a truck and placing them on a conveyor belt, according to an illustrative embodiment of the invention.

FIG. 2B depicts a robot 20a unloading boxes 21 from a truck 29 and placing them on a conveyor belt 22. In this box picking application (as well as in other box picking applications), the robot 20a repetitiously picks a box, rotates, places the box, and rotates back to pick the next box. Although robot 20a of FIG. 2B is a different embodiment from robot 100 of FIGS. 1A and 1B, referring to the components of robot 100 identified in FIGS. 1A and 1B will ease explanation of the operation of the robot 20*a* in FIG. 2B.

During operation, the perception mast of robot 20*a* (analogous to the perception mast 140 of robot 100 of FIGS. 1A and 1B) may be configured to rotate independently of rotation of the turntable (analogous to the turntable 120) on which it is mounted to enable the perception modules (akin to perception modules 142) mounted on the perception mast to capture images of the environment that enable the robot 20*a* to plan its next movement while simultaneously executing a current movement. For example, while the robot 20*a* is picking a first box from the stack of boxes in the truck 29, the perception modules on the perception mast may point at and gather information about the location where the first box is to be placed (e.g., the conveyor belt 22). Then, after the turntable rotates and while the robot 20*a* is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20*a* may parallelize tasks which may otherwise have been performed sequentially, thus enabling faster and more efficient operation.

Also of note in FIG. 2B is that the robot 20*a* is working alongside humans (e.g., workers 27*a* and 27*b*). Given that the robot 20*a* is configured to perform many tasks that have traditionally been performed by humans, the robot 20*a* is designed to have a small footprint, both to enable access to areas designed to be accessed by humans, and to minimize the size of a safety zone around the robot into which humans are prevented from entering.

Figure 2C:
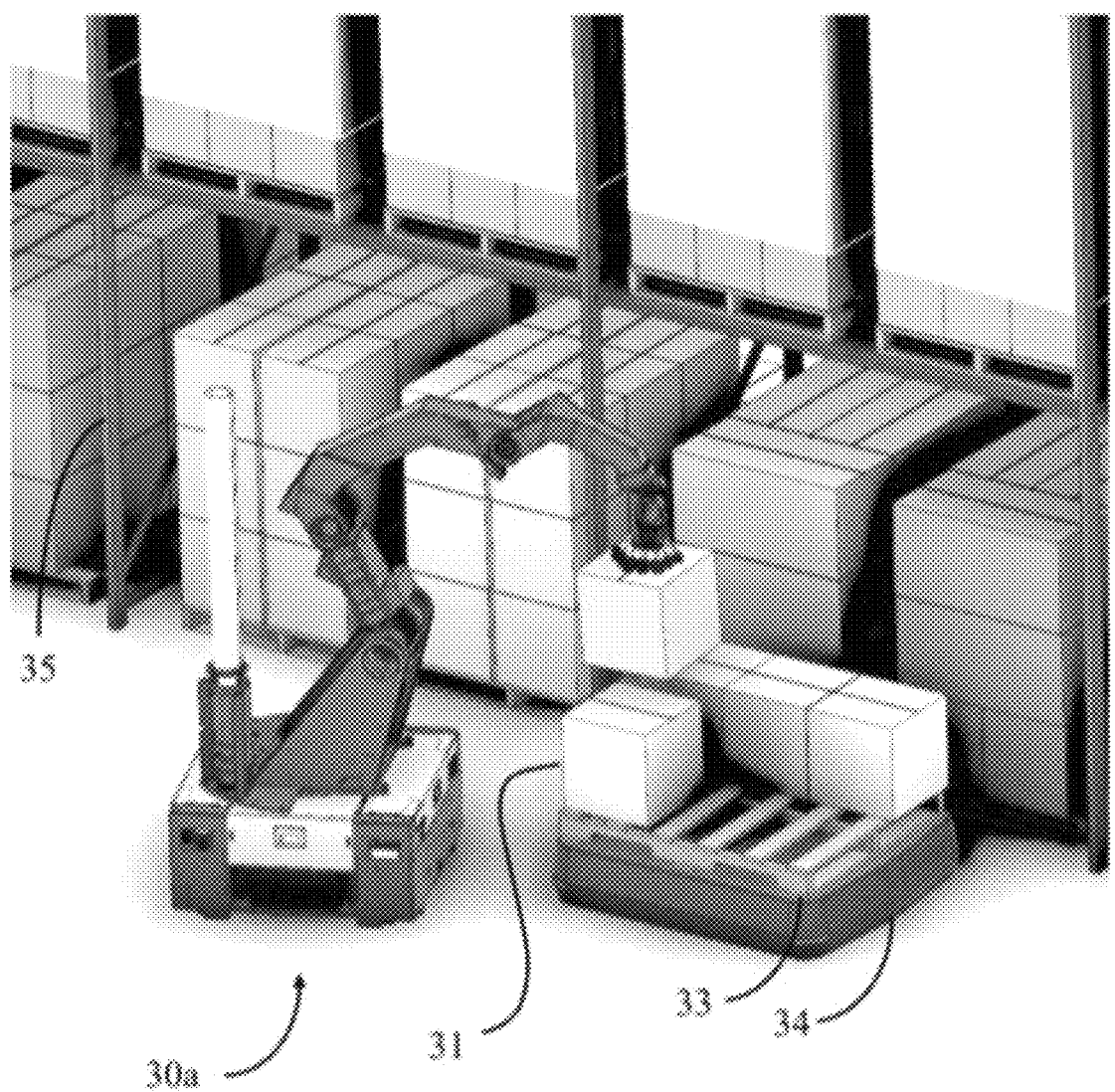
FIG. 2C depicts a robot performing an order building task in which the robot places boxes onto a pallet, according to an illustrative embodiment of the invention.

FIG. 2C depicts a robot 30*a* performing an order building task, in which the robot 30*a* places boxes 31 onto a pallet 33. In FIG. 2C, the pallet 33 is disposed on top of an autonomous mobile robot (AMR) 34, but it should be appreciated that the capabilities of the robot 30*a* described in this example apply to building pallets not associated with an AMR. In this task, the robot 30*a* picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

The tasks depicted in FIGS. 2A-2C are only a few examples of applications in which an integrated mobile manipulator robot may be used, and the present disclosure is not limited to robots configured to perform only these specific tasks. For example, the robots described herein may be suited to perform tasks including, but not limited to: removing objects from a truck or container; placing objects on a conveyor belt; removing objects from a conveyor belt; organizing objects into a stack; organizing objects on a pallet; placing objects on a shelf; organizing objects on a shelf; removing objects from a shelf; picking objects from the top (e.g., performing a "top pick"); picking objects from a side (e.g., performing a "face pick"); coordinating with other mobile manipulator robots; coordinating with other warehouse robots (e.g., coordinating with AMRs); coordinating with humans; and many other tasks.

Example Robotic Arm

Figure 3:
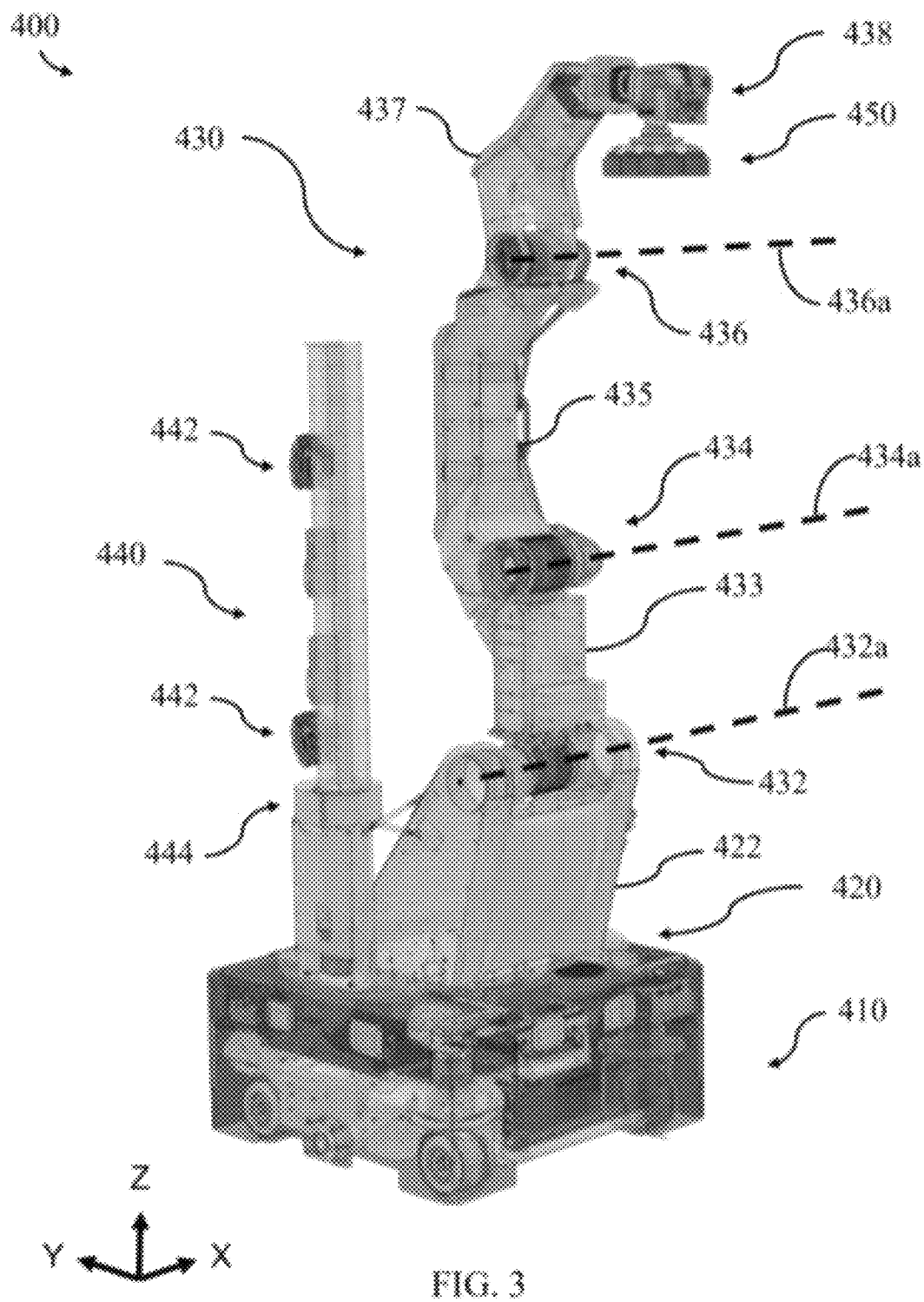
FIG. 3 is a perspective view of a robot, according to an illustrative embodiment of the invention.

FIG. 3 is a perspective view of a robot 400, according to an illustrative embodiment of the invention. The robot 400 includes a mobile base 410 and a turntable 420 rotatably coupled to the mobile base. A robotic arm 430 is operatively coupled to the turntable 420, as is a perception mast 440. The perception mast 440 includes an actuator 444 configured to enable rotation of the perception mast 440 relative to the turntable 420 and/or the mobile base 410, so that a direction of the perception modules 442 of the perception mast may be independently controlled.

The robotic arm 430 of FIG. 3 is a 6-DOF robotic arm. When considered in conjunction with the turntable 420 (which is configured to yaw relative to the mobile base about a vertical axis parallel to the Z axis), the arm/turntable system may be considered a 7-DOF system. The 6-DOF robotic arm 430 includes three pitch joints 432, 434, and 436, and a 3-DOF wrist 438 which, in some embodiments, may be a spherical 3-DOF wrist.

Starting at the turntable 420, the robotic arm 430 includes a turntable offset 422, which is fixed relative to the turntable 420. A distal portion of the turntable offset 422 is rotatably coupled to a proximal portion of a first link 433 at a first joint 432. A distal portion of the first link 433 is rotatably coupled to a proximal portion of a second link 435 at a second joint 434. A distal portion of the second link 435 is rotatably coupled to a proximal portion of a third link 437 at a third joint 436. The first, second, and third joints 432, 434, and 436 are associated with first, second, and third axes 432*a*, 434*a*, and 436*a*, respectively.

The first, second, and third joints 432, 434, and 436 are additionally associated with first, second, and third actuators (not labeled) which are configured to rotate a link about an axis. Generally, the nth actuator is configured to rotate the nth link about the nth axis associated with the nth joint. Specifically, the first actuator is configured to rotate the first link 433 about the first axis 432*a* associated with the first joint 432, the second actuator is configured to rotate the second link 435 about the second axis 434*a* associated with the second joint 434, and the third actuator is configured to rotate the third link 437 about the third axis 436*a* associated with the third joint 436. In the embodiment shown in FIG. 3, the first, second, and third axes 432*a*, 434*a*, and 436*a* are parallel (and, in this case, are all parallel to the X axis). In the embodiment shown in FIG. 3, the first, second, and third joints 432, 434, and 436 are all pitch joints.

In some embodiments, a robotic arm of a highly integrated mobile manipulator robot may include a different number of degrees of freedom than the robotic arms discussed above. Additionally, a robotic arm need not be limited to a robotic arm with three pitch joints and a 3-DOF wrist. A robotic arm of a highly integrated mobile manipulator robot may include any suitable number of joints of any suitable type, whether revolute or prismatic. Revolute joints need not be oriented as pitch joints, but rather may be pitch, roll, yaw, or any other suitable type of joint.

Returning to FIG. 3, the robotic arm 430 includes a wrist 438. As noted above, the wrist 438 is a 3-DOF wrist, and in some embodiments may be a spherical 3-DOF wrist. The wrist 438 is coupled to a distal portion of the third link 437. The wrist 438 includes three actuators configured to rotate an end effector 450 coupled to a distal portion of the wrist 438 about three mutually perpendicular axes. Specifically, the wrist may include a first wrist actuator configured to rotate the end effector relative to a distal link of the arm (e.g., the third link 437) about a first wrist axis, a second wrist actuator configured to rotate the end effector relative to the distal link about a second wrist axis, and a third wrist actuator configured to rotate the end effector relative to the distal link about a third wrist axis. The first, second, and third wrist axes may be mutually perpendicular. In embodiments in which the wrist is a spherical wrist, the first, second, and third wrist axes may intersect.

In some embodiments, an end effector may be associated with one or more sensors. For example, a force/torque sensor may measure forces and/or torques (e.g., wrenches) applied to the end effector. Alternatively or additionally, a sensor may measure wrenches applied to a wrist of the robotic arm by the end effector (and, for example, an object grasped by the end effector) as the object is manipulated. Signals from these (or other) sensors may be used during mass estimation and/or path planning operations. In some embodiments, sensors associated with an end effector may include an integrated force/torque sensor, such as a 6-axis force/torque sensor. In some embodiments, separate sensors (e.g., separate force and torque sensors) may be employed. Some embodiments may include only force sensors (e.g., uniaxial force sensors, or multi-axis force sensors), and some embodiments may include only torque sensors. In some embodiments, an end effector may be associated with a custom sensing arrangement. For example, one or more sensors (e.g., one or more uniaxial sensors) may be arranged to enable sensing of forces and/or torques along multiple axes. An end effector (or another portion of the robotic arm) may additionally include any appropriate number or configuration of cameras, distance sensors, pressure sensors, light sensors, or any other suitable sensors, whether related to sensing characteristics of the payload or otherwise, as the disclosure is not limited in this regard.

Figure 4:
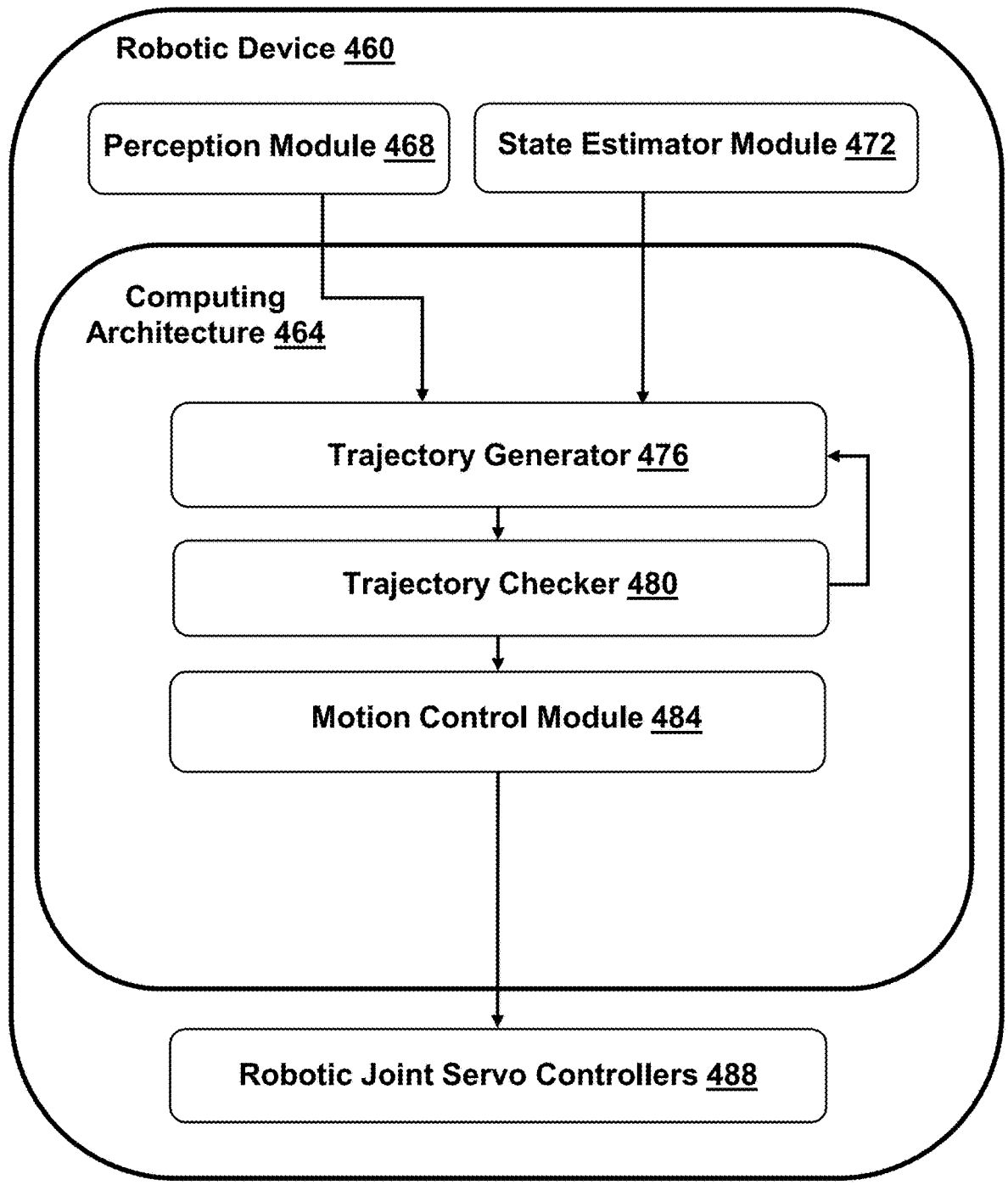
FIG. 4 illustrates an example computing architecture for a robotic device, according to an illustrative embodiment of the invention.

FIG. 4 illustrates an example computing architecture 464 for a robotic device 460, according to an illustrative embodiment of the invention. The computing architecture 464 includes a trajectory generator 476, a trajectory checker 480, and a motion control module 484. The robotic device 460 can also include a perception module 468 (which may include, e.g., the perception mast 140 shown and described above in FIGS. 1A-1B) and/or a state estimator module 472. One or both of these modules can provide input to the trajectory generator 476 (either directly or by way of one or more intermediary modules, e.g., a higher level supervisory module). The robotic device 460 can also include robotic joint servo controllers 488, which can be in communication with the motion control module 484.

During operation, the perception module 468 can perceive one or more objects for grasping (e.g., by an end-effector of the robotic device 460) and/or one or more aspects of the robotic device's environment. In some embodiments, the perception module 468 includes one or more sensors configured to sense the environment. For example, the one or more sensors may include, but are not limited to, a depth camera, a LIDAR or stereo vision device, or another device with suitable sensory capabilities. In some embodiments, the perception module 468 can extract local planar regions (e.g., using one or more plane fitting algorithms) to infer one or more surfaces of objects in view and/or obstacles for the robotic device 460 to avoid. In some embodiments, the perception module 468 includes a behavioral module (which is not depicted separately, although it may be a separate module in practice). The behavioral module can include a planner, which can determine a goal pose for the robotic device 460 (e.g., a position for a robotic arm and/or end effector to reach at a future time). In some embodiments, the planner determines a time period for the robot to move to the goal pose. In some embodiments, the planner determines one or more intermediate "keyframe" poses through which the robotic device passes before reaching the goal pose.

In some embodiments, the trajectory generator 476 is configured to determine a candidate trajectory for at least a portion of a robotic device (e.g., an arm of the robotic device) based, at least in part, on initial state information regarding the robotic device and goal state information describing a desired state of the robotic device. The trajectory generator 476 may receive information about the goal state from the perception module 468. In some instances, the goal state is based on the goal pose to be achieved, but may be specified using a different set of coordinates, such as joint space instead of Cartesian space or task space. The trajectory generator 476 may also receive information about the initial state of the robotic device from the state estimator module 472. In some embodiments, the trajectory generator 476 can additionally receive information from other input sources (e.g., a user can specify information, such as an initial pose, a goal pose, and/or one or more parameters characterizing state). In some embodiments, the trajectory generator 476 is configured to determine the candidate trajectory of the portion of the robotic device using nonlinear optimization, wherein the candidate trajectory defines movements of the portion of the robotic device from the initial state to the goal state. The trajectory generator 476 can pass the candidate trajectory to the trajectory checker 480, which can determine whether the candidate trajectory is feasible (e.g., within the mechanical and safety limitations of the robotic device). If the candidate trajectory is determined to be feasible, the trajectory checker 480 can provide the candidate trajectory to the motion control module 484. If the candidate trajectory is determined not to be feasible, the trajectory generator 476 can calculate a different candidate trajectory for the portion of the robotic device 460 to move from the initial state to the goal state. The different candidate trajectory can be based, at least in part, on one or more changed nonlinear optimization parameters.

In some embodiments, the above process can continue until a feasible candidate trajectory is identified and provided to the motion control module 484. In some embodiments, the process can terminate after a specified number of attempts to identify a feasible candidate trajectory. In some embodiments, the specified number of attempts to identify a feasible candidate trajectory is 1, 2, 3, 5, 10, 20, 30, 40, 50, 100, or another positive integer number. In some embodiments, one or more parameters of nonlinear optimization can be incremented up to a certain number of times and/or up to a certain specified value, such as a pre-defined acceptable limit. If no candidate trajectory is deemed feasible, an error message can be generated. In such a situation, a higher level supervisory module (not shown) may be notified and govern next steps. When a candidate trajectory is deemed feasible, control instructions may be provided to the motion control module 484 to enable the robotic device to move along the candidate trajectory. For instance, the control instructions may include desired joint parameters (e.g., position, velocity and/or acceleration components as functions of time). The motion control module 484 may be configured to use the desired joint parameters to output a reference joint torque for each of the robotic joint servo controllers 488, which can be provided to actuators of the robotic device 460 to enable execution of the planned movement (along with the joint positions, velocities, and/or accelerations, in some embodiments). Additional details of the sub-modules of the computing architecture 464 are set forth in FIGS. 5-7 below.

Figure 5:
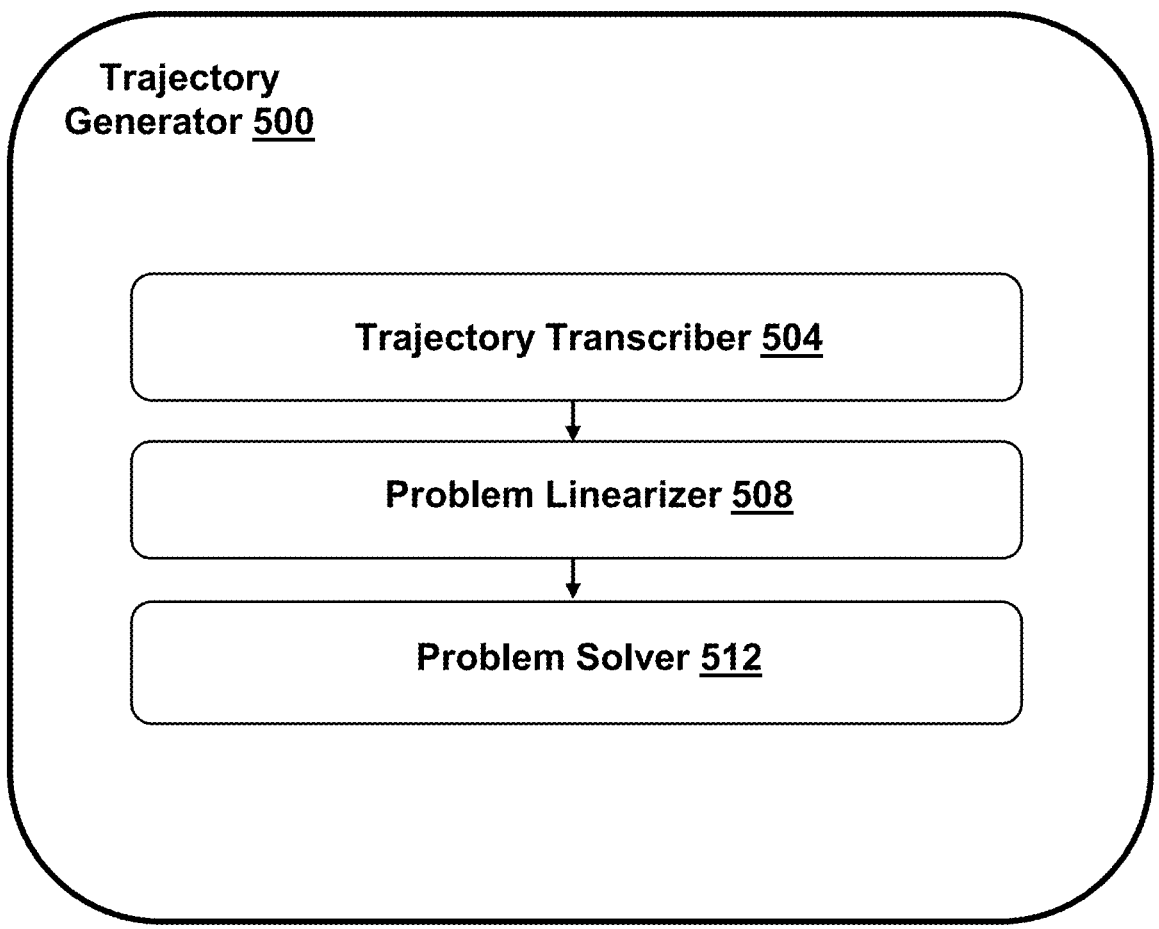
FIG. 5 illustrates an example trajectory generator of a robotic device, according to an illustrative embodiment of the invention.

FIG. 5 illustrates an example trajectory generator 500 of a robotic device, according to an illustrative embodiment of the invention. The trajectory generator 500 includes a trajectory transcriber 504, a problem linearizer 508, and a problem solver 512. The trajectory transcriber 504 can take as input a "go to pose" (e.g., in the form of an SE(3) pose) and/or a time duration for the robot to reach the pose. In some embodiments, inverse kinematics can be performed on the pose to transform the input representation of the pose into joint space. In some embodiments, certain joint positions (e.g., initial joint positions) can be determined (e.g., measured using one or more sensors and/or specified by a user). The trajectory transcriber 504 can also take as input one or more limitations (e.g., constraints) and/or minimization criteria (e.g., objectives). In some embodiments, some of these functions can take the form of equalities to be satisfied (e.g., constraints), and some can take the form of inequalities to be satisfied (e.g., constraints and/or objectives). The trajectory transcriber 504 can store the constraints and/or objectives in memory in communication with the computing device. In some embodiments, the trajectory transcriber 504 can include an application programming interface (API) for a user to specify one or more inputs.

The trajectory transcriber 504 can use some or all of this information to formulate a nonlinear problem and/or initialize it with a set of starting values. The problem linearizer 508 can then transcribe the nonlinear problem into a quadratic problem, linearize constraints and/or objectives, and store decision variables. The nonlinear nature of the constraints and/or objectives allows them to be integrated into an NLP problem, which can be solved numerically (e.g., using a SQP approach). In some embodiments, trajectories can be represented using a set of parameters, e.g., decision variables such as a sequence of polynomial splines, each described by a set of spline coefficients. The problem solver 512 can then determine an optimal set of parameters that satisfies all constraints and/or minimizes all objectives. The problem solver 512 can thus solve the nonlinear problem based on certain specified nonlinear optimization parameters. Ultimately, the problem solver 512 can output a set of parameters (e.g., spline coefficients representing a candidate trajectory) for the robot to move from the initial state to the goal state. In some embodiments, a candidate trajectory can be specified in joint space and/or take the form of a sequence of polynomial splines.

The below table illustrates a set of problem components (e.g., constraints, objectives, or other mathematical limitations) that enables generation of a motion that moves at least a portion of a robotic device (e.g., an end effector) from an initial state to a goal state. Note that this table does not necessarily take into account collisions, but can produce a smooth trajectory that guides an end effector to a desired target:

TABLE 1

A set of problem components that enables generation of a motion that moves an end effector from an initial state to a goal state.

| Component Name | Component Type | Setup/Description |
| --- | --- | --- |
| Initial state | Constraint or Objective | The most recent desired joint angles can be imported as initial positions. Initial velocities and accelerations can be set to zero. |
| Final state | Constraint or Objective | The final joint positions can be obtained from inverse kinematics on a desired SE(3) pose. The final velocities and accelerations can be set to zero. |
| Joint limits | Inequality Constraint | Joint positions and velocities can be limited by values obtained from the robot's mechanical design. |
| Connected splines | Equality Constraints | Each pair of successive segments can be connected up to the highest derivative (which depends on the order of the segments, e.g., cubic, quintic, etc.). |
| Smooth trajectories | Objective | Variation of derivatives can be minimized. |
| Regularizer | Objective | A regularization term can be added as a cost that penalizes a deviation of the NLP solution from the previous NLP iteration. The cost can have a weight associated with it (e.g., computed as an exponentially decreasing value). |

Figure 6:
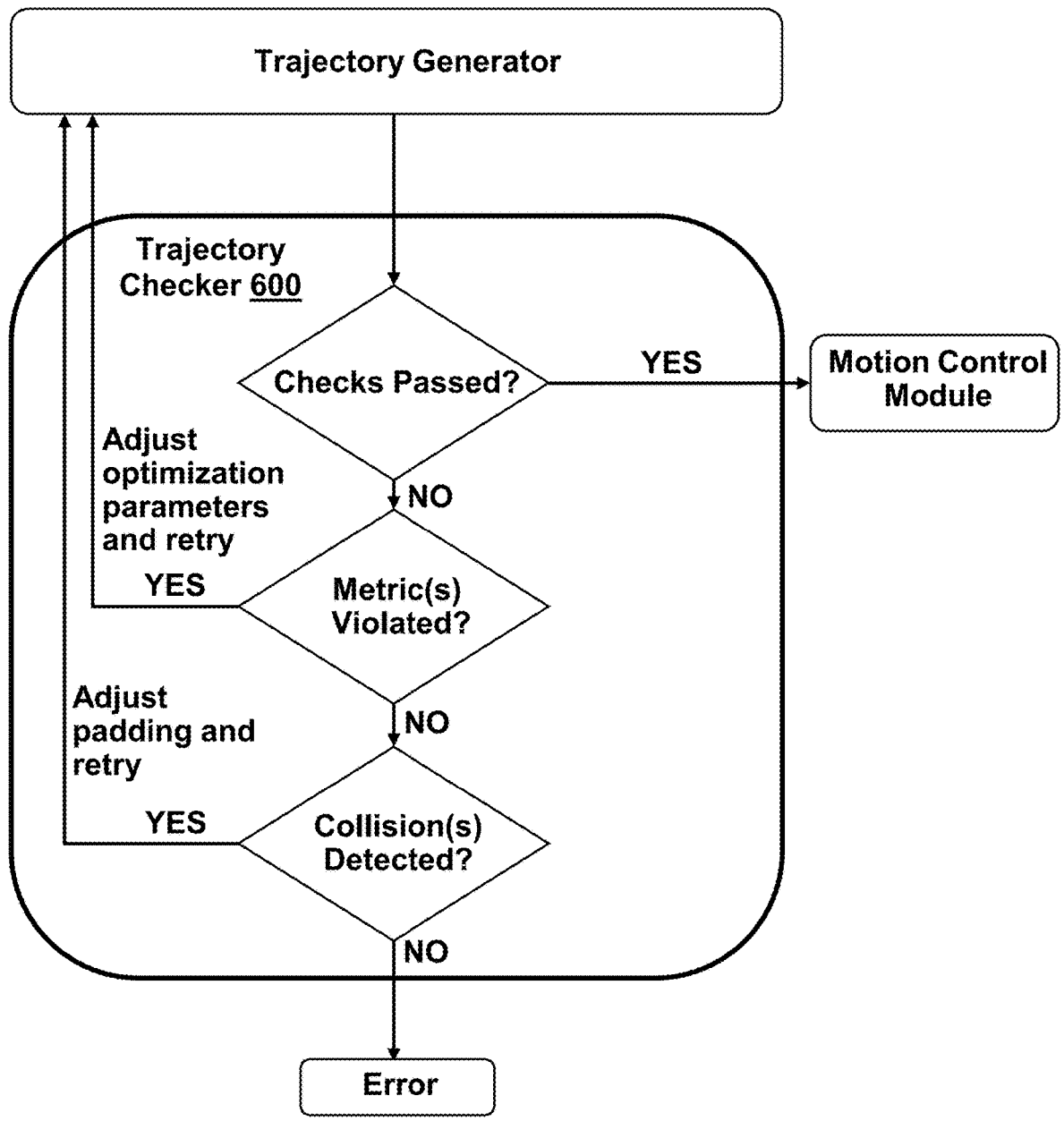
FIG. 6 illustrates an example trajectory checker of a robotic device, according to an illustrative embodiment of the invention.

FIG. 6 illustrates an example trajectory checker 600 of a robotic device, according to an illustrative embodiment of the invention. The trajectory checker 600 can receive the candidate trajectory and determine whether it is feasible. In some embodiments, the trajectory checker 600 runs a set of checks, including, e.g., whether certain metrics of the robot (such as joint limits, power output, or other metrics) have been violated and/or whether collisions have been detected and/or predicted. If the checks are passed, the candidate trajectory is deemed to be feasible and information about the candidate trajectory can be provided to the motion control module (e.g., the motion control module 484 shown and described above in FIG. 4). If the checks are not passed, the trajectory checker 600 may determine that the candidate trajectory is not feasible and can take different actions depending on the reason for the failure. For example, if the trajectory checker 600 determines that one or more metrics of the robotic device have been violated, the trajectory checker 600 can prompt the trajectory generator to determine a different candidate trajectory (e.g., for violated joint limits, one approach is to increase the duration of the proposed movement from the initial state to the goal state-which trajectory can, in turn, be checked again). If the trajectory checker 600 determines that the metrics have not been violated, the trajectory checker 600 can ask whether any collisions have been detected and/or are predicted. If so, the trajectory checker 600 can prompt the trajectory generator to determine a different candidate trajectory (e.g., by adding extra padding to one or more parameters of the trajectory calculation, as shown and described below in connection with FIG. 8), and this different candidate trajectory can also be checked again. If the joint limits have not been violated (and no other checks are employed), the trajectory generator can output an error. In some embodiments, in such instances a higher level module (e.g., a supervisory module) can govern next steps. Other checks and/or additional checks are also possible.

Figure 7:
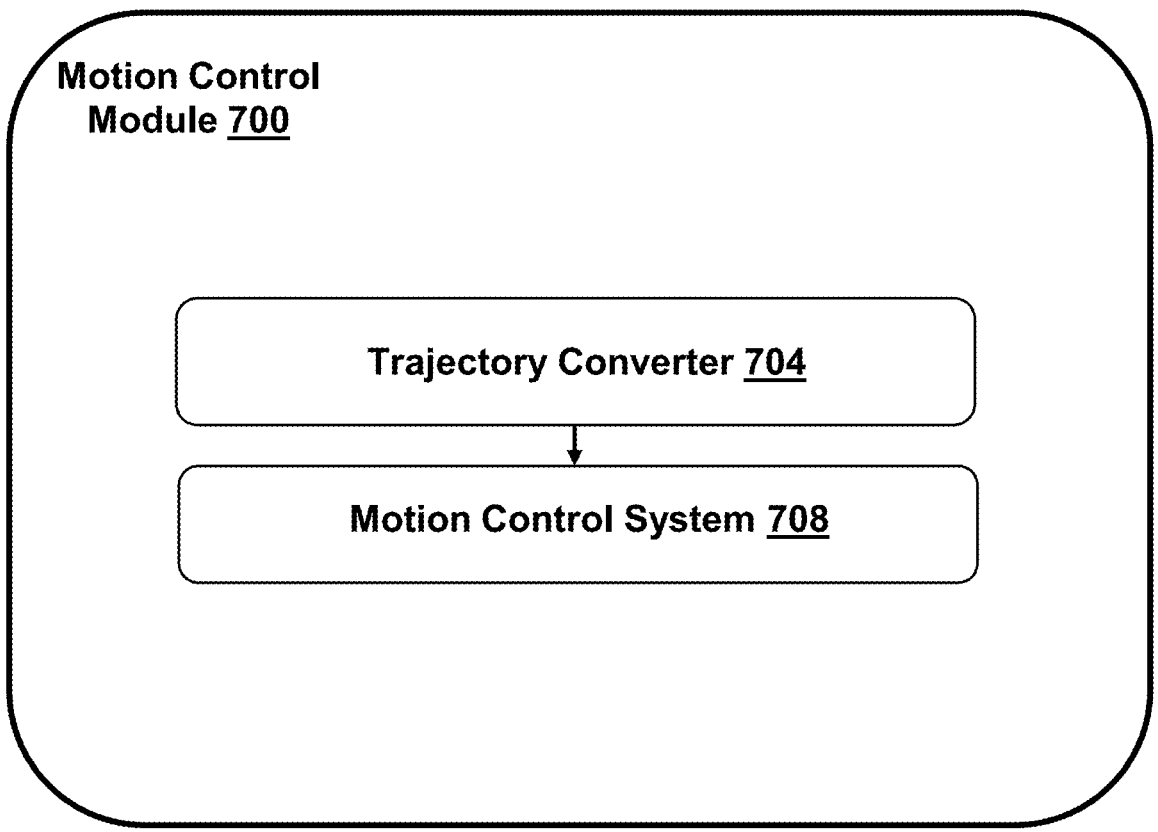
FIG. 7 illustrates an example motion control module of a robotic device, according to an illustrative embodiment of the invention.

FIG. 7 illustrates an example motion control module 700 of a robotic device, according to an illustrative embodiment of the invention. The motion control module 700 includes a trajectory converter 704 and a motion control system 708. The trajectory converter 704 can receive the feasible candidate trajectory from the trajectory generator (e.g., the trajectory generator 500 shown and described above in FIG. 5), after being verified by the trajectory checker (e.g., the trajectory checker 600 shown and described above in FIG. 6). In some embodiments, the trajectory converter 704 receives the feasible candidate trajectory in the form of an optimal set of parameters, e.g., spline coefficients. The trajectory converter 704 can wrap the received set of parameters into a trajectory (e.g., a single joint or end-effector state) that can be queried at a specified time to obtain a system state at the queried time. The trajectory converter 704 can provide the feasible candidate trajectory to the motion control system 708, which can calculate desired metrics (e.g., reference torques, positions, velocities, and/or accelerations) for each of one or more joints or end effectors of the robotic device. The motion control system 708 can also calculate commands for the robotic joint servo controllers (e.g., the robotic joint servo controllers 428 shown and described above in FIG. 4), which can be provided to actuators of the robotic device and/or used to move the robotic device. In some embodiments, the motion control system 708 can use a feedback control system to further refine its computations before providing output to the robotic joint servo controllers.

Figure 8A:
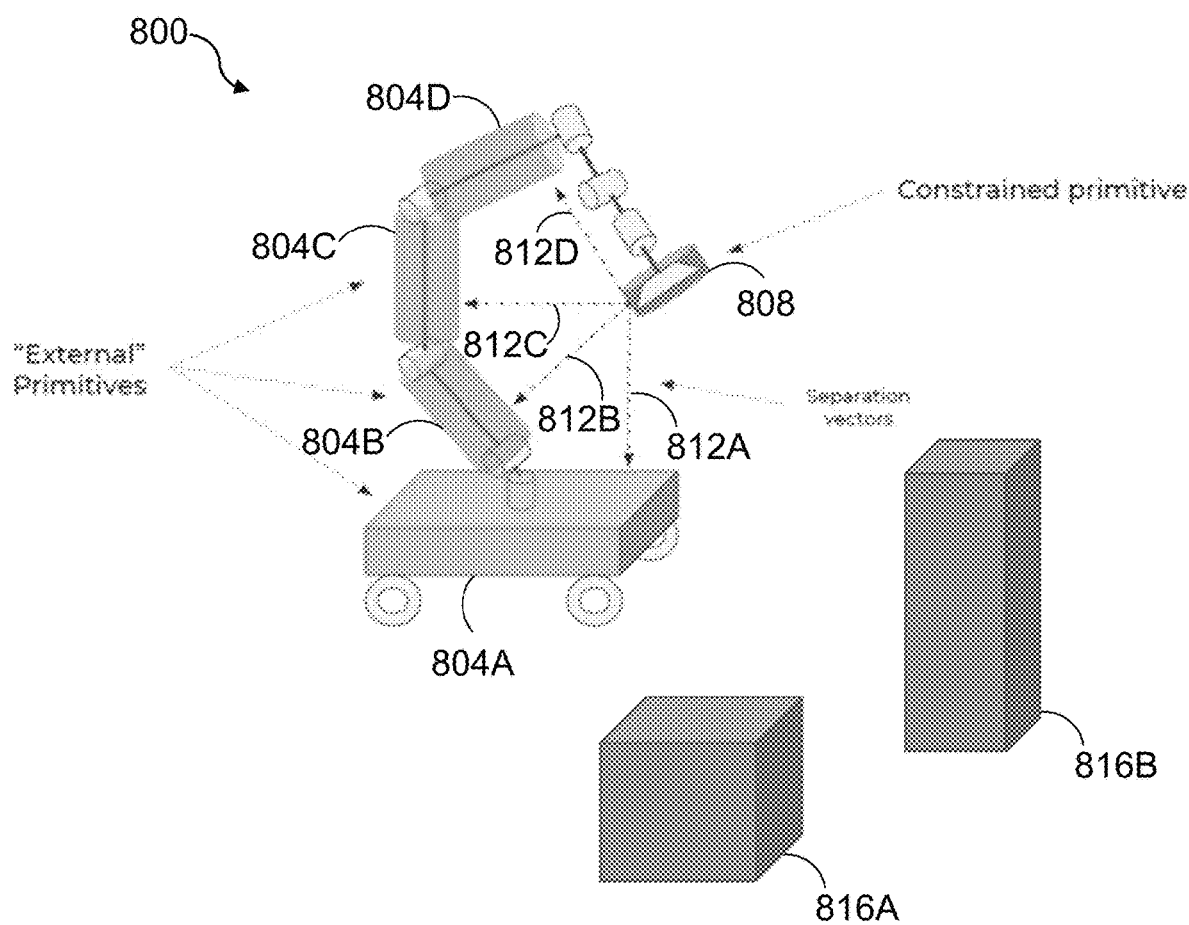
FIG. 8A shows exemplary "external primitive" and "constrained primitive" approximations of a robot, according to an illustrative embodiment of the invention.

In some embodiments, a robot can use certain approximations (e.g., in determining candidate trajectories and/or conducting feasibility assessments) to help avoid collisions (e.g., between different portions of itself or with objects in its surrounding environment). FIG. 8A shows exemplary "external primitives" 804A-D and "constrained primitive" 808 approximations of a robot 800, according to an illustrative embodiment of the invention. The constrained primitive corresponds to a robot link that is planned to avoid collisions, and each of the external primitives corresponds to other robot links and/or external environmental objects which the constrained primitive is to avoid. As such, these "primitive" approximations can be used to avoid potential collisions during operation both with the environment and with the robot 800 itself.

To implement collision avoidance, constraints that limit the distance between primitives can be formulated. The primitives can be simple geometric shapes (e.g., spheres, boxes, etc.) or more complicated geometric shapes. Separation vectors (e.g., separation vectors 812A-812D) can be computed to determine distances between certain primitives of interest (e.g., between constrained primitive 808 and external primitives 804A-D) to provide quantifiable metrics to help ensure that collisions are avoided (e.g., by ensuring that the distances remain above a specified positive number). In some embodiments, two points (one on each primitive) that are closest together can be determined, and the vector connecting the two points can determine the corresponding separation vector.

In some embodiments, padding can help to account for errors in perception, calibration, and/or approximation errors, and can provide a "buffer" in case an error is made.

In some embodiments, padding is provided via a multiplicative or additive factor that widens or reduces the bounds of a constraint. For example, for a constraint $f(x)<M$, a padding parameter $P_1$ may be added by re-writing the constraint as $f(x)<M+P_1$. Such an approach may be used in collision avoidance, e.g., to make distances appear larger or smaller than they actually are to avoid too close of an encounter. As another example, a padding parameter $P_2$ may be added by re-writing the constraint $g(x)<N$ as $g(x)<N*P_2$. Such an approach may be used for joint limits, e.g., to make it appear that the range of motion is smaller than it actually is to approximate a robustness metric and/or avoid getting too close to the real joint limits. In some embodiments, global padding can be equal for all collisions. In some embodiments, external padding can be unique for each external collision (e.g., walls can be padded more than boxes). In some embodiments, additional padding can be unique to each internal-external collision pair at each time step and/or can be changed at runtime. In some embodiments, additional environmental obstacles (e.g., boxes 816A-B) can be accounted for and avoided using similar means.

Figure 8B:
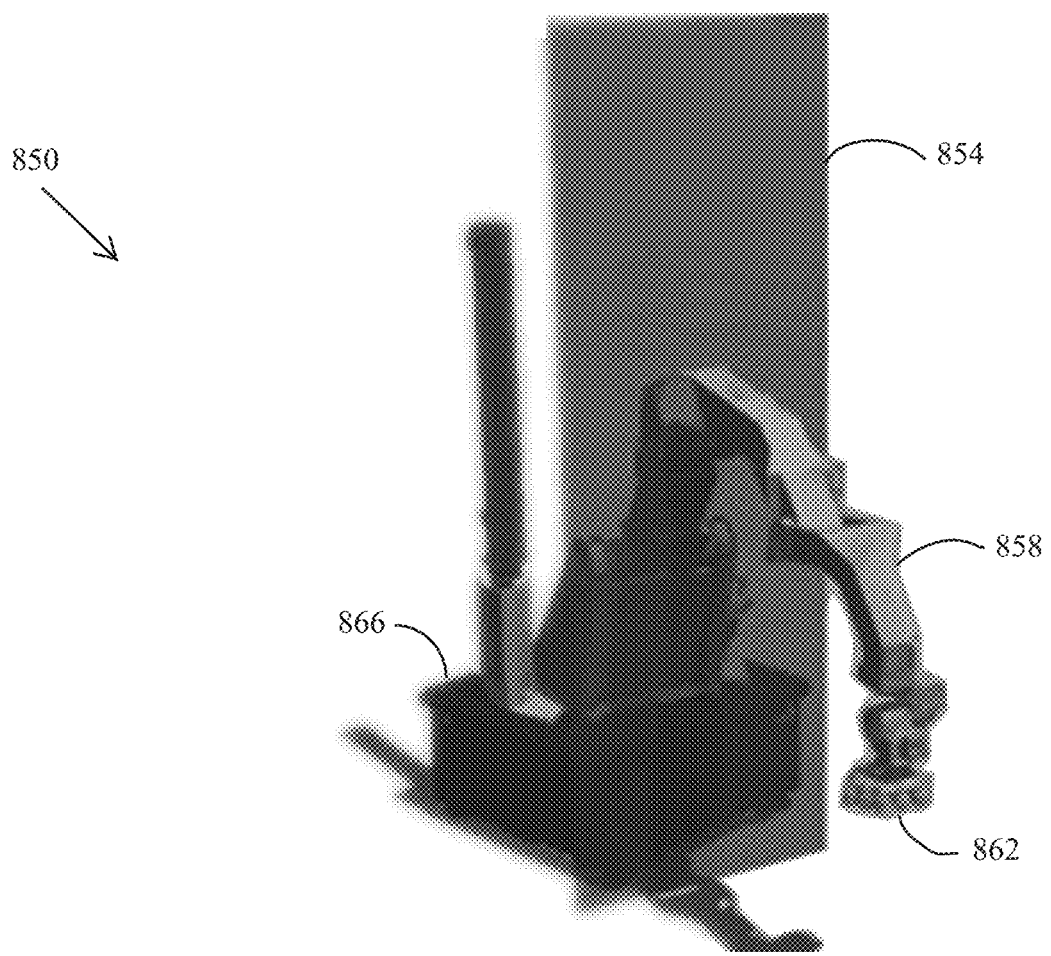
FIG. 8B shows an exemplary "virtual wall" of a robot that is used in accordance with some embodiments to avoid collisions.

FIG. 8B shows an exemplary "virtual wall" 854 of a robot 850 that is used in accordance with some embodiments to avoid collisions. The position of the virtual wall 854 can be configured such that the arm 858 and/or end effector 862 of the robot 850 do not collide with the base 866 of the robot 850. Since the robot 850 is a non-convex surface, such a tool can be used to approximate it as convex for computation purposes (e.g., by limiting an x-coordinate of the end-effector position, effectively giving rise to the virtual wall between the end effector 862 and the base 866). In some embodiments, payload collisions can be avoided by transforming a full set of vertices of the payload (e.g., eight vertices at each corner of a box) to a simpler set of vertices (e.g., two vertices, one at the center of each of two opposing faces of the box). In some embodiments, both self-collisions and payload collisions can be avoided by formulating constraints that limit a distance between points on the robotic arm and the closest object in the environment (e.g., using a "primitives" approach as described above in FIG. 8A).

Figure 9A:
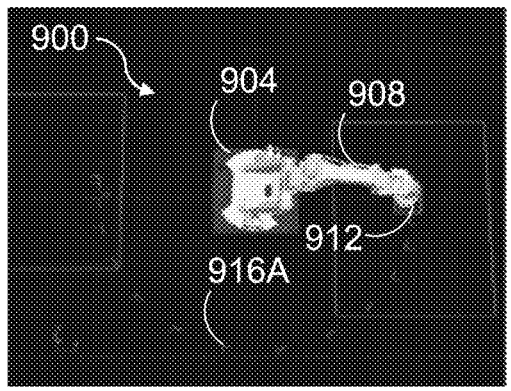
FIGS. 9A-9C show an exemplary series of frames representing a trajectory corresponding to an end-effector rotation with "tucker" objectives disabled, according to an illustrative embodiment of the invention.
Figure 9D:
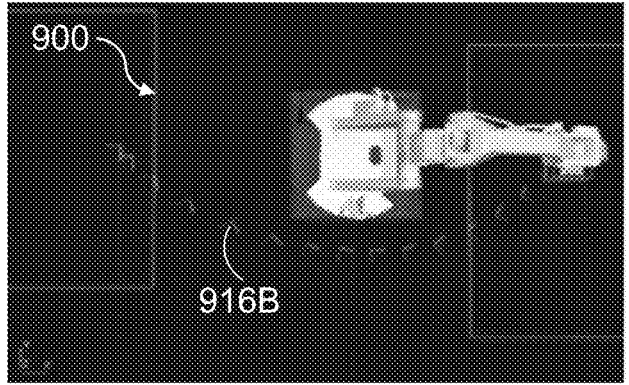
FIGS. 9D-9F show an exemplary series of motion capture frames corresponding to an end-effector rotation with "tucker" objectives enabled, according to an illustrative embodiment of the invention.
Figure 9B:
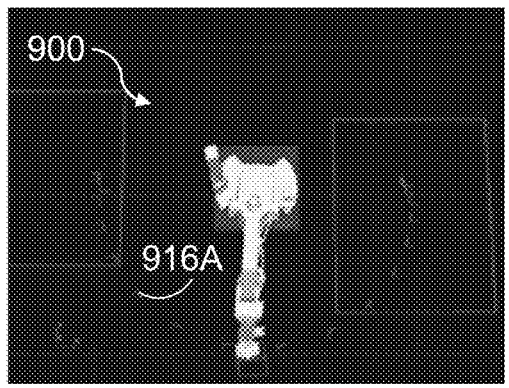
Figure 9E:
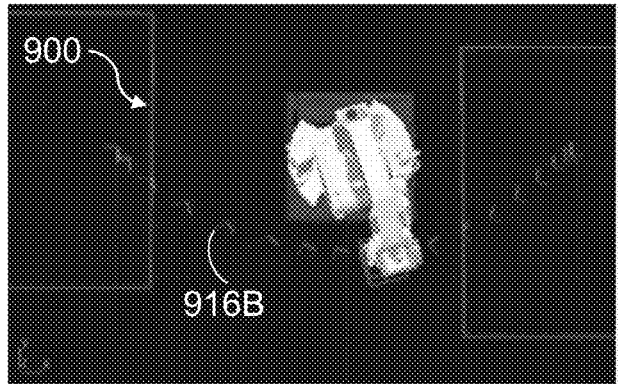
Figure 9C:
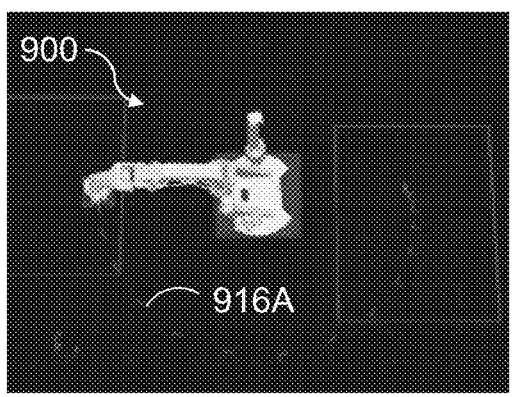
Figure 9F:
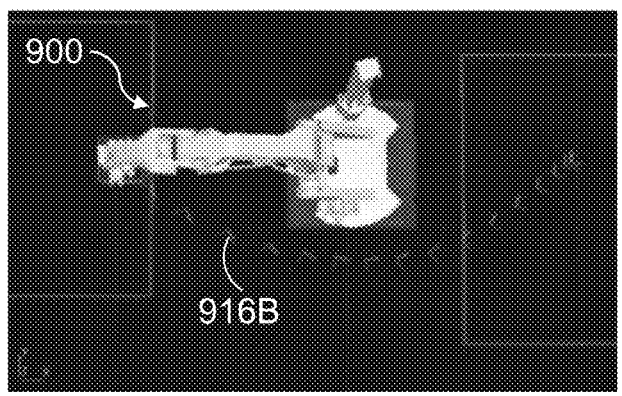

FIGS. 9A-9C show an exemplary series of frames representing a trajectory corresponding to an end-effector rotation with "tucker" objectives disabled, while FIGS. 9D-9F show an exemplary series of motion capture frames corresponding to an end-effector rotation with "tucker" objectives enabled, according to illustrative embodiments of the invention. The robot 900 has a base 904, an arm 908, and an end effector 912 attached to the arm 908. In each case, the arm 908 swings from the right side to the left side of the image. In FIGS. 9A-9C, the arm 908 swings through a trajectory 916A; in FIGS. 9D-9F, the arm 908 swings through a trajectory 916B; both trajectories 916A, 916B are represented as a series of frames showing the positions and orientations of the end-effector sampled at regular time intervals during the trajectory. The further the end effector 912 is from the base 904, the greater the chance that the reference motions produce high tracking torques (as shown, e.g., in FIGS. 9A-9C) that may cause undesirable consequences, e.g., the grip between the end effector 912 and any grasped objects to loosen or be fully compromised. To mitigate this issue, a "tuck" motion can be introduced such that the end effector 912 is pulled toward the base 904 during the motion through the trajectory, e.g., when one or more joints experiences high acceleration. In some embodiments, the objective's cost function (e.g., as described above) can be computed based on a suitable metric, e.g., a product of a spatial coordinate of the end-effector position and an acceleration experienced at a joint. In some embodiments, end-effector acceleration (e.g., a single linear or angular acceleration) can be minimized directly (e.g., as a minimization criterion as described above). In some embodiments, the shape of the trajectory can be calculated to avoid a collision (e.g., a collision between the end effector or a box it grabs and a different portion of the robot, such as the base). In some embodiments, a target distance between the end effector 912 and an environmental constraint can be specified as a means of avoiding a collision, and trajectory parameters can be calculated accordingly. In some embodiments, a torque on each joint or a sum of torques on all joints can be minimized, e.g., using joint-space dynamics of the robot 900.

Figure 10:
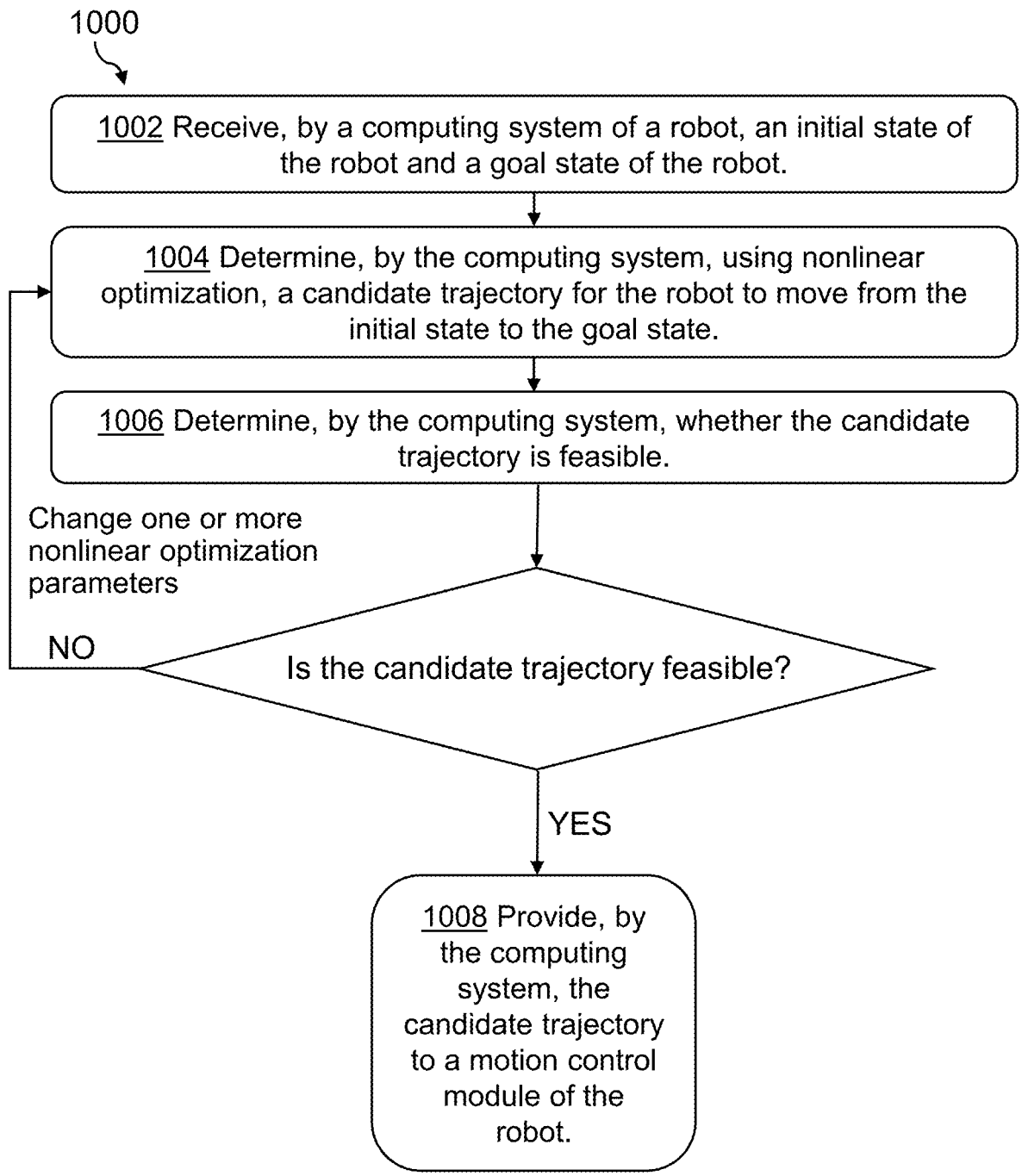
FIG. 10 is a flowchart of an exemplary computer-implemented method, according to an illustrative embodiment of the invention.

FIG. 10 is a flowchart of an exemplary computer-implemented method 1000, according to an illustrative embodiment of the invention. At a first operation 1002, a computing system of a robot receives an initial state of the robot and a goal state of the robot. At a second operation 1004, the computing system determines, using nonlinear optimization, a candidate trajectory for the robot to move from the initial state to the goal state. At a third operation 1006, the computing system determines whether the candidate trajectory is feasible. If the candidate trajectory is determined to be feasible, the computing system provides the candidate trajectory to a motion control module of the robot. If the candidate trajectory is not determined to be feasible, one or more parameters of nonlinear optimization is changed, and the computing device determines a different candidate trajectory for the robot to move from the initial state to the goal state.

Figure 11:
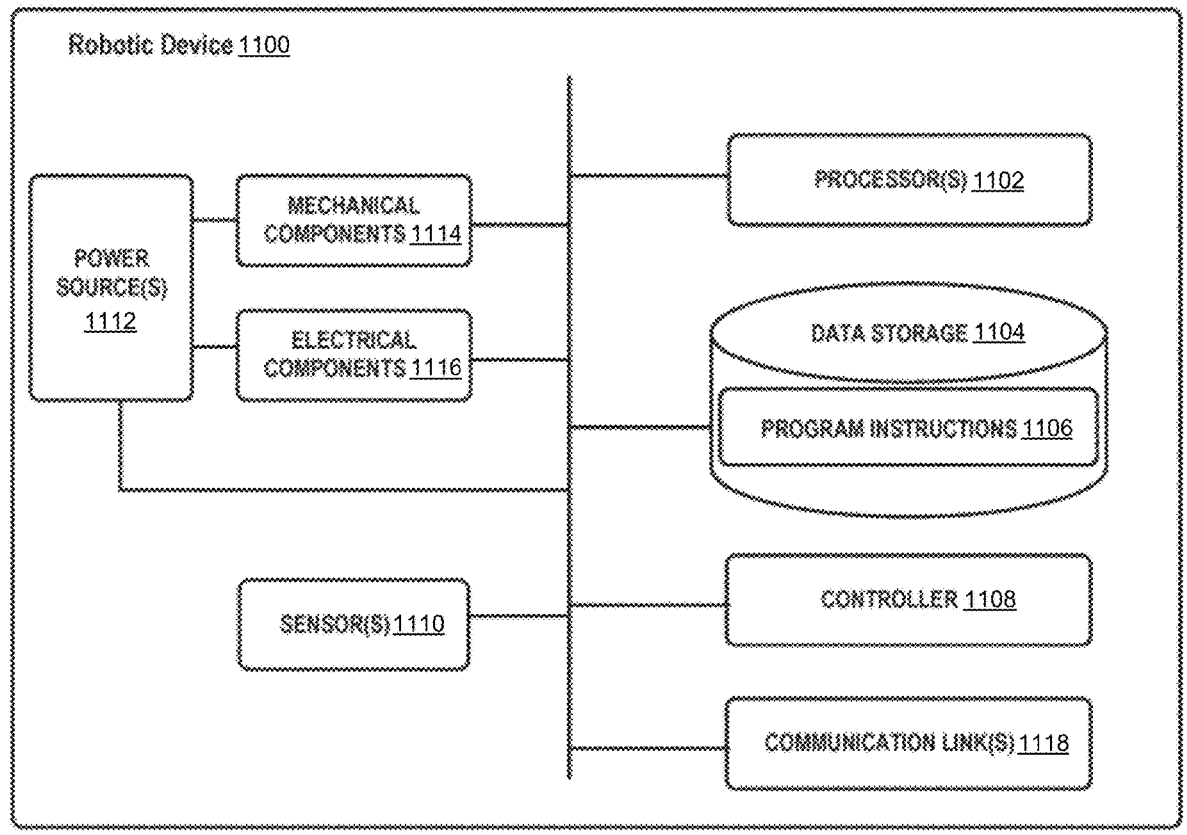
FIG. 11 illustrates an example configuration of a robotic device, according to an illustrative embodiment of the invention.

FIG. 11 illustrates an example configuration of a robotic device, according to an illustrative embodiment of the invention. An example implementation involves a robotic device configured with at least one robotic limb, one or more sensors, and a processing system. The robotic limb may be an articulated robotic appendage including a number of members connected by joints. The robotic limb may also include a number of actuators (e.g., 2-5 actuators) coupled to the members of the limb that facilitate movement of the robotic limb through a range of motion limited by the joints connecting the members. The sensors may be configured to measure properties of the robotic device, such as angles of the joints, pressures within the actuators, joint torques, and/or positions, velocities, and/or accelerations of members of the robotic limb(s) at a given point in time. The sensors may also be configured to measure an orientation (e.g., a body orientation measurement) of the body of the robotic device (which may also be referred to herein as the "base" of the robotic device). Other example properties include the masses of various components of the robotic device, among other properties. The processing system of the robotic device may determine the angles of the joints of the robotic limb, either directly from angle sensor information or indirectly from other sensor information from which the joint angles can be calculated. The processing system may then estimate an orientation of the robotic device based on the sensed orientation of the base of the robotic device and the joint angles.

An orientation may herein refer to an angular position of an object. In some instances, an orientation may refer to an amount of rotation (e.g., in degrees or radians) about three axes. In some cases, an orientation of a robotic device may refer to the orientation of the robotic device with respect to a particular reference frame, such as the ground or a surface on which it stands. An orientation may describe the angular position using Euler angles, Tait-Bryan angles (also known as yaw, pitch, and roll angles), and/or Quaternions. In some instances, such as on a computer-readable medium, the orientation may be represented by an orientation matrix and/or an orientation quaternion, among other representations.

In some scenarios, measurements from sensors on the base of the robotic device may indicate that the robotic device is oriented in such a way and/or has a linear and/or angular velocity that requires control of one or more of the articulated appendages in order to maintain balance of the robotic device. In these scenarios, however, it may be the case that the limbs of the robotic device are oriented and/or moving such that balance control is not required. For example, the body of the robotic device may be tilted to the left, and sensors measuring the body's orientation may thus indicate a need to move limbs to balance the robotic device; however, one or more limbs of the robotic device may be extended to the right, causing the robotic device to be balanced despite the sensors on the base of the robotic device indicating otherwise. The limbs of a robotic device may apply a torque on the body of the robotic device and may also affect the robotic device's center of mass. Thus, orientation and angular velocity measurements of one portion of the robotic device may be an inaccurate representation of the orientation and angular velocity of the combination of the robotic device's body and limbs (which may be referred to herein as the "aggregate" orientation and angular velocity).

In some implementations, the processing system may be configured to estimate the aggregate orientation and/or angular velocity of the entire robotic device based on the sensed orientation of the base of the robotic device and the measured joint angles. The processing system has stored thereon a relationship between the joint angles of the robotic device and the extent to which the joint angles of the robotic device affect the orientation and/or angular velocity of the base of the robotic device. The relationship between the joint angles of the robotic device and the motion of the base of the robotic device may be determined based on the kinematics and mass properties of the limbs of the robotic devices. In other words, the relationship may specify the effects that the joint angles have on the aggregate orientation and/or angular velocity of the robotic device. Additionally, the processing system may be configured to determine components of the orientation and/or angular velocity of the robotic device caused by internal motion and components of the orientation and/or angular velocity of the robotic device caused by external motion. Further, the processing system may differentiate components of the aggregate orientation in order to determine the robotic device's aggregate yaw rate, pitch rate, and roll rate (which may be collectively referred to as the "aggregate angular velocity").

In some implementations, the robotic device may also include a control system that is configured to control the robotic device on the basis of a simplified model of the robotic device. The control system may be configured to receive the estimated aggregate orientation and/or angular velocity of the robotic device, and subsequently control one or more jointed limbs of the robotic device to behave in a certain manner (e.g., maintain the balance of the robotic device). For instance, the control system may determine locations at which to place the robotic device's feet and/or the force to exert by the robotic device's feet on a surface based on the aggregate orientation.

In some implementations, the robotic device may include force sensors that measure or estimate the external forces (e.g., the force applied by a leg of the robotic device against the ground) along with kinematic sensors to measure the orientation of the limbs of the robotic device. The processing system may be configured to determine the robotic device's angular momentum based on information measured by the sensors. The control system may be configured with a feedback-based state observer that receives the measured angular momentum and the aggregate angular velocity, and provides a reduced-noise estimate of the angular momentum of the robotic device. The state observer may also receive measurements and/or estimates of torques or forces acting on the robotic device and use them, among other information, as a basis to determine the reduced-noise estimate of the angular momentum of the robotic device.

The control system may be configured to actuate one or more actuators connected across components of a robotic leg. The actuators may be controlled to raise or lower the robotic leg. In some cases, a robotic leg may include actuators to control the robotic leg's motion in three dimensions. Depending on the particular implementation, the control system may be configured to use the aggregate orientation, along with other sensor measurements, as a basis to control the robot in a certain manner (e.g., stationary balancing, walking, running, galloping, etc.).

In some implementations, multiple relationships between the joint angles and their effect on the orientation and/or angular velocity of the base of the robotic device may be stored on the processing system. The processing system may select a particular relationship with which to determine the aggregate orientation and/or angular velocity based on the joint angles. For example, one relationship may be associated with a particular joint being between 0 and 90 degrees, and another relationship may be associated with the particular joint being between 91 and 180 degrees. The selected relationship may more accurately estimate the aggregate orientation of the robotic device than the other relationships.

In some implementations, the processing system may have stored thereon more than one relationship between the joint angles of the robotic device and the extent to which the joint angles of the robotic device affect the orientation and/or angular velocity of the base of the robotic device. Each relationship may correspond to one or more ranges of joint angle values (e.g., operating ranges). In some implementations, the robotic device may operate in one or more modes. A mode of operation may correspond to one or more of the joint angles being within a corresponding set of operating ranges. In these implementations, each mode of operation may correspond to a certain relationship.

The angular velocity of the robotic device may have multiple components describing the robotic device's orientation (e.g., rotational angles) along multiple planes. From the perspective of the robotic device, a rotational angle of the robotic device turned to the left or the right may be referred to herein as "yaw." A rotational angle of the robotic device upwards or downwards may be referred to herein as "pitch." A rotational angle of the robotic device tilted to the left or the right may be referred to herein as "roll." Additionally, the rate of change of the yaw, pitch, and roll may be referred to herein as the "yaw rate," the "pitch rate," and the "roll rate," respectively.

Referring now to the figures, FIG. 11 illustrates an example configuration of a robotic device (or "robot") 1100, according to an illustrative embodiment of the invention. The robotic device 1100 represents an example robotic device configured to perform the operations described herein. Additionally, the robotic device 1100 may be configured to operate autonomously, semi-autonomously, and/ or using directions provided by user(s), and may exist in various forms, such as a humanoid robot, biped, quadruped, or other mobile robot, among other examples. Furthermore, the robotic device 1100 may also be referred to as a robotic system, mobile robot, or robot, among other designations.

As shown in FIG. 11, the robotic device 1100 includes processor(s) 1102, data storage 1104, program instructions 1106, controller 1108, sensor(s) 1110, power source(s) 1112, mechanical components 1114, and electrical components 1116. The robotic device 1100 is shown for illustration purposes and may include more or fewer components without departing from the scope of the disclosure herein. The various components of robotic device 1100 may be connected in any manner, including via electronic communication means, e.g., wired or wireless connections. Further, in some examples, components of the robotic device 1100 may be positioned on multiple distinct physical entities rather on a single physical entity. Other example illustrations of robotic device 1100 may exist as well.

Processor(s) 1102 may operate as one or more general-purpose processor or special purpose processors (e.g., digital signal processors, application specific integrated circuits, etc.). The processor(s) 1102 can be configured to execute computer-readable program instructions 1106 that are stored in the data storage 1104 and are executable to provide the operations of the robotic device 1100 described herein. For instance, the program instructions 1106 may be executable to provide operations of controller 1108, where the controller 1108 may be configured to cause activation and/or deactivation of the mechanical components 1114 and the electrical components 1116. The processor(s) 1102 may operate and enable the robotic device 1100 to perform various functions, including the functions described herein.

The data storage 1104 may exist as various types of storage media, such as a memory. For example, the data storage 1104 may include or take the form of one or more computer-readable storage media that can be read or accessed by processor(s) 1102. The one or more computer-readable storage media can include volatile and/or non-volatile storage components, such as optical, magnetic, organic or other memory or disc storage, which can be integrated in whole or in part with processor(s) 1102. In some implementations, the data storage 1104 can be implemented using a single physical device (e.g., one optical, magnetic, organic or other memory or disc storage unit), while in other implementations, the data storage 1104 can be implemented using two or more physical devices, which may communicate electronically (e.g., via wired or wireless communication). Further, in addition to the computer-readable program instructions 1106, the data storage 1104 may include additional data such as diagnostic data, among other possibilities.

The robotic device 1100 may include at least one controller 1108, which may interface with the robotic device 1100. The controller 1108 may serve as a link between portions of the robotic device 1100, such as a link between mechanical components 1114 and/or electrical components 1116. In some instances, the controller 1108 may serve as an interface between the robotic device 1100 and another computing device. Furthermore, the controller 1108 may serve as an interface between the robotic system 1100 and a user(s). The controller 1108 may include various components for communicating with the robotic device 1100, including one or more joysticks or buttons, among other features. The controller 1108 may perform other operations for the robotic device 1100 as well. Other examples of controllers may exist as well.

Additionally, the robotic device 1100 includes one or more sensor(s) 1110 such as force sensors, proximity sensors, motion sensors, load sensors, position sensors, touch sensors, depth sensors, ultrasonic range sensors, and/or infrared sensors, among other possibilities. The sensor(s) 1110 may provide sensor data to the processor(s) 1102 to allow for appropriate interaction of the robotic system 1100 with the environment as well as monitoring of operation of the systems of the robotic device 1100. The sensor data may be used in evaluation of various factors for activation and deactivation of mechanical components 1114 and electrical components 1116 by controller 1108 and/or a computing system of the robotic device 1100.

The sensor(s) 1110 may provide information indicative of the environment of the robotic device for the controller 1108 and/or computing system to use to determine operations for the robotic device 1100. For example, the sensor(s) 1110 may capture data corresponding to the terrain of the environment or location of nearby objects, which may assist with environment recognition and navigation, etc. In an example configuration, the robotic device 1100 may include a sensor system that may include a camera, RADAR, LIDAR, time-of-flight camera, global positioning system (GPS) transceiver, and/or other sensors for capturing information of the environment of the robotic device 1100. The sensor(s) 1110 may monitor the environment in real-time and detect obstacles, elements of the terrain, weather conditions, temperature, and/or other parameters of the environment for the robotic device 1100.

Further, the robotic device 1100 may include other sensor(s) 1110 configured to receive information indicative of the state of the robotic device 1100, including sensor(s) 1110 that may monitor the state of the various components of the robotic device 1100. The sensor(s) 1110 may measure activity of systems of the robotic device 1100 and receive information based on the operation of the various features of the robotic device 1100, such the operation of extendable legs, arms, or other mechanical and/or electrical features of the robotic device 1100. The sensor data provided by the sensors may enable the computing system of the robotic device 1100 to determine errors in operation as well as monitor overall functioning of components of the robotic device 1100.

For example, the computing system may use sensor data to determine the stability of the robotic device 1100 during operations as well as measurements related to power levels, communication activities, components that require repair, among other information. As an example configuration, the robotic device 1100 may include gyroscope(s), accelerometer(s), and/or other possible sensors to provide sensor data relating to the state of operation of the robotic device. Further, sensor(s) 1110 may also monitor the current state of a function, such as a gait, that the robotic system 1100 may currently be operating. Additionally, the sensor(s) 1110 may measure a distance between a given robotic leg of a robotic device and a center of mass of the robotic device. Other example uses for the sensor(s) 1110 may exist as well.

Additionally, the robotic device 1100 may also include one or more power source(s) 1112 configured to supply power to various components of the robotic device 1100. Among possible power systems, the robotic device 1100 may include a hydraulic system, electrical system, batteries, and/or other types of power systems. As an example illustration, the robotic device 1100 may include one or more batteries configured to provide power to components via a wired and/or wireless connection. Within examples, components of the mechanical components 1114 and electrical components 1116 may each connect to a different power source or may be powered by the same power source. Components of the robotic system 1100 may connect to multiple power sources as well.

Within example configurations, any type of power source may be used to power the robotic device 1100, such as a gasoline and/or electric engine. Further, the power source(s) 1112 may charge using various types of charging, such as wired connections to an outside power source, wireless charging, combustion, or other examples. Other configurations may also be possible. Additionally, the robotic device 1100 may include a hydraulic system configured to provide power to the mechanical components 1114 using fluid power. Components of the robotic device 1100 may operate based on hydraulic fluid being transmitted throughout the hydraulic system to various hydraulic motors and hydraulic cylinders, for example. The hydraulic system of the robotic device 1100 may transfer a large amount of power through small tubes, flexible hoses, or other links between components of the robotic device 1100. Other power sources may be included within the robotic device 1100.

Mechanical components 1114 can represent hardware of the robotic system 1100 that may enable the robotic device 1100 to operate and perform physical functions. As a few examples, the robotic device 1100 may include actuator(s), extendable leg(s) ("legs"), arm(s), wheel(s), one or multiple structured bodies for housing the computing system or other components, and/or other mechanical components. The mechanical components 1114 may depend on the design of the robotic device 1100 and may also be based on the functions and/or tasks the robotic device 1100 may be configured to perform. As such, depending on the operation and functions of the robotic device 1100, different mechanical components 1114 may be available for the robotic device 1100 to utilize. In some examples, the robotic device 1100 may be configured to add and/or remove mechanical components 1114, which may involve assistance from a user and/or other robotic device. For example, the robotic device 1100 may be initially configured with four legs, but may be altered by a user or the robotic device 1100 to remove two of the four legs to operate as a biped. Other examples of mechanical components 1114 may be included.

The electrical components 1116 may include various components capable of processing, transferring, providing electrical charge or electric signals, for example. Among possible examples, the electrical components 1116 may include electrical wires, circuitry, and/or wireless communication transmitters and receivers to enable operations of the robotic device 1100. The electrical components 1116 may interwork with the mechanical components 1114 to enable the robotic device 1100 to perform various operations. The electrical components 1116 may be configured to provide power from the power source(s) 1112 to the various mechanical components 1114, for example. Further, the robotic device 1100 may include electric motors. Other examples of electrical components 1116 may exist as well.

In some implementations, the robotic device 1100 may also include communication link(s) 1118 configured to send and/or receive information. The communication link(s) 1118 may transmit data indicating the state of the various components of the robotic device 1100. For example, information read in by sensor(s) 1110 may be transmitted via the communication link(s) 1118 to a separate device. Other diagnostic information indicating the integrity or health of the power source(s) 1112, mechanical components 1114, electrical components 1118, processor(s) 1102, data storage 1104, and/or controller 1108 may be transmitted via the communication link(s) 1118 to an external communication device.

In some implementations, the robotic device 1100 may receive information at the communication link(s) 1118 that is processed by the processor(s) 1102. The received information may indicate data that is accessible by the processor(s) 1102 during execution of the program instructions 1106, for example. Further, the received information may change aspects of the controller 1108 that may affect the behavior of the mechanical components 1114 or the electrical components 1116. In some cases, the received information indicates a query requesting a particular piece of information (e.g., the operational state of one or more of the components of the robotic device 1100), and the processor(s) 1102 may subsequently transmit that particular piece of information back out the communication link(s) 1118.

In some cases, the communication link(s) 1118 include a wired connection. The robotic device 1100 may include one or more ports to interface the communication link(s) 1118 to an external device. The communication link(s) 1118 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, radio, Bluetooth, or a near-field communication (NFC) device.

A number of implementations have been described. Nevertheless, it will be understood that various modifications may be made without departing from the spirit and scope of the disclosure.

The invention claimed is:

1. A computer-implemented method comprising:
   (a) receiving, by a computing system of a robot from a perception module of the robot, an initial state of at least a portion of the robot and a goal state of the at least a portion of the robot;
   (b) providing as input to a nonlinear solver implemented by the computing system, a first representation of the initial state and a second representation of the goal state, wherein the nonlinear solver is configured to determine using the first representation, the second representation, and nonlinear optimization, a candidate trajectory for the at least a portion of the robot to move from the initial state to the goal state, the candidate trajectory including parameters for each of a plurality of joints corresponding to the at least a portion of the robot;
   (c) determining, by the computing system, whether the candidate trajectory is feasible; and
   (d) controlling, by the computing system, when it is determined that the candidate trajectory is feasible, actuators associated with the plurality of joints corresponding to the at least a portion of the robot based on the parameters for each of the plurality of joints to move the at least a portion of the robot from the initial state to the goal state.

2. The method of claim 1, further including performing steps (a) and/or (b) until
   (i) a feasible candidate trajectory is determined, or
   (ii) a number of attempts to determine a feasible candidate trajectory is unsuccessful and no trajectory is determined after the number of attempts.

3. The method of claim 1, further including determining, by the nonlinear solver implemented by the computing system, when the candidate trajectory is not feasible, a different candidate trajectory for the at least a portion of the robot to move from the initial state to the goal state, the nonlinear optimization using one or more changed parameters.

4. The method of claim 1, wherein the parameters include a set of reference torques for the plurality of joints.

5. The method of claim 4, further comprising:
   transforming the set of reference torques into a set of actuator commands, wherein controlling actuators associated with the plurality of joints comprises controlling the actuators based on the set of actuator commands.

6. The method of claim 1, wherein determining whether the candidate trajectory is feasible includes determining whether a robot joint limit has been exceeded.

7. The method of claim 6, wherein the robot joint limit includes a padding parameter.

8. The method of claim 1, wherein determining whether the candidate trajectory is feasible includes determining whether a collision is predicted based on a projected distance between a portion of the robot and at least one of an object in an environment of the robot, a payload of the robot, or a different portion of the robot.

9. The method of claim 8, wherein the projected distance is determined based, at least in part, on a padding parameter.

10. The method of claim 1, further comprising computing the parameters for each of the plurality of joints using sequential quadratic programming.

11. The method of claim 1, wherein the nonlinear solver is configured to determine the candidate trajectory by, at least in part, minimizing a cost function of the at least a portion of the robot while satisfying a set of one or more constraints.

12. The method of claim 11, wherein the set of one or more constraints is applied at one or more times or phases of the candidate trajectory.

13. The method of claim 1, wherein the candidate trajectory reflects at least one of: (i) a robot joint limit constraint; (ii) a trajectory smoothness criterion; or (iii) a collision avoidance constraint.

14. The method of claim 1, wherein the nonlinear solver is configured to determine the candidate trajectory by, at least in part, minimizing at least one of the following: (i) one or more task-space accelerations; (ii) a payload wrench; or (iii) a trajectory time.

15. The method of claim 1, wherein the robot includes a robot arm and the candidate trajectory is used to move at least a portion of the robot arm.

16. A computing system of a robot comprising:
   data processing hardware; and
   memory hardware in communication with the data processing hardware, the memory hardware storing instructions that when executed on the data processing hardware cause the data processing hardware to perform operations comprising:
   (a) receiving, by a computing system of a robot from a perception module of the robot, an initial state of at least a portion of the robot and a goal state of the at least a portion of the robot;
   (b) providing as input to a nonlinear solver implemented by the computing system, a first representation of the initial state and a second representation of the goal state, wherein the nonlinear solver is configured to determine using the first representation, the second representation, and nonlinear optimization, a candidate trajectory for the at least a portion of the robot to move from the initial state to the goal state, the candidate trajectory including parameters for each of a plurality of joints corresponding to the at least a portion of the robot;

(c) determining, by the computing system, whether the candidate trajectory is feasible; and (d) controlling, by the computing system, when it is determined that the candidate trajectory is feasible, actuators associated with the plurality of joints corresponding to the at least a portion of the robot based on the parameters for each of the plurality of joints to move the at least a portion of the robot from the initial state to the goal state.

17. The system of claim 16, wherein steps (a) and/or (b) are performed until
  (i) a feasible candidate trajectory is determined, or
  (ii) a number of attempts to determine a feasible candidate trajectory is unsuccessful and no trajectory is determined after the number of attempts.

18. The system of claim 16, wherein the operations further include determining, by the nonlinear solver implemented by the computing system, when the candidate trajectory is not feasible, a different candidate trajectory for the at least a portion of the robot to move from the initial state to the goal state, the nonlinear optimization using one or more changed parameters.

19. The system of claim 16, wherein the parameters include a set of reference torques for the plurality of joints.

20. The system of claim 19, wherein the operations further comprise transforming the set of reference torques into a set of actuator commands, wherein controlling actuators associated with the plurality of joints comprises controlling the actuators based on the set of actuator commands.

21. The system of claim 16, wherein determining whether the candidate trajectory is feasible includes determining whether a robot joint limit has been exceeded.

22. The system of claim 21, wherein the robot joint limit includes a padding parameter.

23. The system of claim 16, wherein determining whether the candidate trajectory is feasible includes determining whether a collision is predicted based on a projected distance between a portion of the robot and at least one of an object in an environment of the robot, a payload of the robot, or a different portion of the robot.

24. The system of claim 23, wherein the projected distance is determined based, at least in part, on a padding parameter.

25. The system of claim 16, further comprising computing the parameters for each of the plurality of joints using sequential quadratic programming.

26. The system of claim 16, wherein the nonlinear solver is configured to determine the candidate trajectory by, at least in part, minimizing a cost function of the at least a portion of the robot while satisfying a set of one or more constraints.

27. The system of claim 26, wherein the set of one or more constraints is applied at one or more times or phases of the candidate trajectory.

28. The system of claim 16, wherein the candidate trajectory reflects at least one of: (i) a robot joint limit constraint; (ii) a trajectory smoothness criterion; or (iii) a collision avoidance constraint.

29. The system of claim 16, wherein the nonlinear solver is configured to determine the candidate trajectory by, at least in part, minimizing at least one of the following: (i) one or more task-space accelerations; (ii) a payload wrench; or (iii) a trajectory time.

30. The system of claim 16, wherein the robot includes a robot arm and the candidate trajectory is used to move at least a portion of the robot arm.

31. The method of claim 1, wherein the candidate trajectory includes a plurality of successive segments, and wherein the nonlinear solver is configured to determine the candidate trajectory for the at least a portion of the robot to move from the initial state to the goal state by, at least in part, connecting the plurality of successive segments using a high order derivative spline, wherein an order of the high order derivative spline is determined based, at least in part, on one or more of the plurality of successive segments.

32. The method of claim 1, wherein the nonlinear solver is configured to determine the candidate trajectory for the at least a portion of the robot to move from the initial state to the goal state by, at least in part, minimizing a variation of derivatives in the nonlinear optimization.

33. The method of claim 1, wherein the nonlinear solver is configured to determine the candidate trajectory for the at least a portion of the robot to move from the initial state to the goal state by, at least in part, including a regularization term in the nonlinear optimization.

34. The method of claim 1, wherein the first representation is a first keyframe and the second representation is a second keyframe.

35. The method of claim 34, wherein the nonlinear solver is configured to determine the candidate trajectory further using at least one intermediate keyframe between the first keyframe and the second keyframe.

36. The system of claim 16, wherein the candidate trajectory includes a plurality of successive segments, and wherein the nonlinear solver is configured to determine the candidate trajectory for the at least a portion of the robot to move from the initial state to the goal state by, at least in part, connecting the plurality of successive segments using a high order derivative spline, wherein an order of the high order derivative spline is determined based, at least in part, on one or more of the plurality of successive segments.

37. The system of claim 16, wherein the nonlinear solver is configured to determine the candidate trajectory for the at least a portion of the robot to move from the initial state to the goal state by, at least in part, minimizing a variation of derivatives in the nonlinear optimization.

38. The system of claim 16, wherein the nonlinear solver is configured to determine the candidate trajectory for the at least a portion of the robot to move from the initial state to the goal state by, at least in part, including a regularization term in the nonlinear optimization.

39. The system of claim 16, wherein the first representation is a first keyframe and the second representation is a second keyframe.

40. The system of claim 39, wherein the nonlinear solver is configured to determine the candidate trajectory further using at least one intermediate keyframe between the first keyframe and the second keyframe.

\* \* \* \* \*